(12) United States Patent
Ko et al.

(10) Patent No.: US 6,744,813 B1
(45) Date of Patent: Jun. 1, 2004

(54) SYSTEM AND METHOD FOR ESTIMATING NOISE CHARACTERISTICS IN THE PRESENCE OF NON-STATIONARY NOISE

(75) Inventors: Ken Ko, Clearwater, FL (US); William Betts, St. Petersburg, FL (US)

(73) Assignee: Paradyne Corporation, Largo, FL (US)

( * ) Notice: Subject to any disclaimer, the term of this patent is extended or adjusted under 35 U.S.C. 154(b) by 0 days.

(21) Appl. No.: 09/550,299

(22) Filed: Apr. 14, 2000

Related U.S. Application Data
(60) Provisional application No. 60/129,615, filed on Apr. 16, 1999.

(51) Int. Cl.[7] .......................... H04B 17/00; H04B 3/46; H04Q 1/20
(52) U.S. Cl. ........................ 375/224; 375/227
(58) Field of Search ................. 375/224, 232, 375/296, 147, 134, 130; 341/200; 702/66, 77

(56) References Cited

U.S. PATENT DOCUMENTS 4,633,411 A * 12/1986 Bliss ........................... 702/77
5,870,436 A * 2/1999 Kolanek et al. ............ 375/316

OTHER PUBLICATIONS

Document entitled "G.gen: Quiescent Mode," source: Alcatel Bell, Geneva, Oct. 12–23, 1998.

* cited by examiner

*Primary Examiner*—Stephen Chin
*Assistant Examiner*—Curtis Odom
(74) *Attorney, Agent, or Firm*—Thomas, Kayden, Horstemeyer & Risley, LLP

(57) ABSTRACT

A thresholding noise estimator detects and samples an error signal during a sampling period. When the magnitude of a noise sample, also known as an error sample, is at least equal to a predefined threshold, the power of that error sample is calculated. At the end of the sampling period, the computed powers of the error samples (only those data samples having a magnitude at least equal to the predefined threshold) are averaged. This average power corresponds to an error indicator which quantitatively indicates the power for that portion(s) of an error signal which is at least equal to the threshold. Alternative embodiments provide for magnitude hysteresis, time hysteresis, or both magnitude and time hysteresis in the determination of an error indicator. Also, alternative embodiments provide for adding the power of the peak error sample to the average power in the determination of an error indicator, or, provide for adding an interleaved average peak power to the average power in the determination of an error indicator.

71 Claims, 12 Drawing Sheets

SYSTEM AND METHOD FOR ESTIMATING NOISE CHARACTERISTICS IN THE PRESENCE OF NON-STATIONARY NOISE

CLAIM OF PRIORITY

This application claims priority to co-pending U.S. provisional application entitled, "Noise Determination in a Time Varying Environment Using Error Thresholding," assigned Ser. No. 60/129,615, and filed April 16, 1999, which is incorporated herein by reference.

CROSS-REFERENCE TO RELATED APPLICATIONS

This application is related to co-pending commonly assigned U.S. patent application entitled "System and Method For Adapting an Equalizer in the Presence of Non-Stationary Noise" filed on even date herewith, which is incorporated herein by reference.

TECHNICAL FIELD

The present invention is generally related to determination of data transmission capability parameters of communications systems employed in a network, and more particularly to a system and method for estimating signaling error probability in a communications link by determining the power levels of noise.

BACKGROUND OF THE INVENTION

With the increasing bandwidth demands from the advent of the Internet, service providers have looked for ways to increase data transmission performance over the copper wire local loop transmission lines that connect the telephone central offices (COs) to the customer premises (CPs). The customer premises equipment (CPE) is connected to the CO switches over the above mentioned transmission lines known as "local loops," "subscriber loops," "loops," or the "last mile" of the telephone network. Historically, the public switched telephone network (PSTN) evolved with subscriber loops connected to a telephone network with circuit-switched capabilities that were designed to carry analog voice communications. Digital service provision to the customer premises is a more recent development. With it, the telephone network has evolved from a system capable of only carrying analog voice communications into a system which can simultaneously carry voice and digital data.

Because of the prohibitive costs of replacing or supplementing existing subscriber loops, technologies have been implemented that utilize existing subscriber loops to provide easy and low cost migration to digital technologies. Subscriber loops capable of carrying digital signals are known as digital subscriber lines (DSLs). Logical channels within a subscriber line which carry digital signals are known as DSL channels, while logical channels within a subscriber line which carry plain old telephone service (POTS) analog signals are known as POTS channels. Some DSL technologies, such as but not limited to integrated services digital network (ISDN), high-bit-rate digital subscriber line (HDSL), HDSL2 and symmetric digital subscriber line (SDSL), may utilize portions of the POTS channel and therefore do not coexist with a POTS signal. Other digital technologies provide customers with additional flexibility and enhanced services by utilizing frequency-division multiplexing and/or time-division multiplexing techniques to fully exploit a subscriber loop with multiple logical channels. These newer multiple channel DSL technologies provide digital service to the customer premises without significantly interfering with the existing POTS equipment and wiring. The newer DSL technologies accomplish this functionality by frequency-division multiplexing (FDM) their digital signal above (at higher frequencies than) the 0 KHz to 4 KHz frequency range, within which standard analog POTS signals are carried. Multiplexing techniques and terminology are common to those skilled in the art, and are not described herein.

Several variations of new multiple channel DSL technology exist, such as but not limited to Asymmetric Digital Subscriber Line (ADSL), Rate Adaptive Digital Subscriber Line (RADSL), Very High Speed DSL (VDSL), Multiple Virtual Lines (MVL™) and Tripleplay™, with this group generally referred to as xDSL. Communications systems carrying xDSL may multiplex xDSL signals and a POTS signal onto a single physical local loop.

Historically, the POTS subscriber loop was designed with the functions needed to communicate both analog, voice-conversation signals and subscriber loop signaling. The CO switch uses subscriber loop signaling to notify the customer premises about events in the telephone network, while customer premises equipment (CPE) use subscriber loop signaling to inform the CO to perform actions for the customer. Some examples of subscriber loop signaling include: the CO switch signaling to the CPE that an incoming call has arrived by ringing the phone, the CPE (e.g., a telephone) signaling to the CO switch that the CPE is initiating a call by an on-hook to off-hook transition of the telephone handset, and the CPE signaling to the CO switch that a call should be connected to a location by sending the phone number of the location.

Although the transmission of both digital signals and analog POTS signals over a subscriber loop offers many potential advantages for customers, several practical problems must be solved when implementing DSL solutions. One significant problem resulting from the POTS subscriber loop signaling functions is the generation of high-frequency interference or noise into DSL channels. This high-frequency noise interferes with the decoding of a received signal. One category of noise is predictable to a reasonable degree. This predictable noise is often referred to as stationary (or cyclo-stationary) noise. Noise that is stationary or slowly varying can be anticipated, and to a degree corrected for, in the transmission of a digital signal.

Another category of noise is commonly referred to in the art as non-stationary noise. Non-stationary refers to the statistically unpredictable nature of the noise over the time period of interest. That is, it is more difficult to anticipate when non-stationary noise will occur, anticipate the strength of the non-stationary noise, or anticipate the duration of the non-stationary noise. For instance, a telephony system on-hook/off-hook signal or a pulse-dialing signal are square waveforms which have high-frequency components and harmonics. Theoretically, these telephony system signals require infinite frequency bandwidth and are therefore difficult to anticipate and compensate.

Another source of noise is crosstalk. Crosstalk is undesirable interference or noise that is induced into a channel by signals travelling in adjacent subscriber loops sharing the same underground cable or overhead wire. FIG. 1 is a schematic view of a prior art communication system showing a CO 22 connected to a CP 24 via a single subscriber loop 26. Typically, many individual subscriber loops 28 are bundled together at convenient locations into one cable 30. The cable 30 extends back to the CO 22. The close proximity of the many subscriber loops 28 to subscriber loop 26 results in magnetic and/or capacitive coupling between subscriber loop 26 and some of the other subscriber loops 28 adjacent thereto. Undesirable interference may be induced into subscriber loop 26 as various communication signals are transmitted across the subscriber loops 28. For example, one type of crosstalk occurs when a modem rapidly and repeatedly transitions between an ON state (transmitting data) and OFF state (not transmitting). During the ON state, the modem induces noise onto adjacent subscriber loop 26 which has characteristics similar to stationary noise. However, when the modem in the OFF state, no noise is induced into subscriber loop 26. This noise, induced into subscriber loop 26 by a modem which is rapidly transitioning between the ON and OFF states, has characteristics of both stationary and non-stationary noise, and is referred to in the art as short-term stationary (STS) noise. Since an individual cable may contain up to several thousand subscriber loops, STS noise can be a commonly encountered noise source.

FIG. 2 shows a typical data constellation as would be used in carrierless amplitude/phase modulation (CAP), quadrature amplitude modulation (QAM), Discrete MultiTone (DMT), or similar DSL modulation techniques. In this illustrative example, a 16 point constellation 40 is shown as a series of points 410 through 425 aligned with X axis 42 and Y axis 44 on a two dimensional grid. Each point represents a symbol which may be sent from the DSL transmitter to the DSL receiver. The symbols may be corrupted during transmission by channel distortion, noise, crosstalk, and the like. The receiver will determine which symbol was transmitted by the remote transmitter by determining in which decision region 46 the received symbol (after any equalization and/or other processing) lies, as defined by decision boundaries 48. Note that X axis 42 and Y axis 44 are also decision boundaries in this illustrative example.

As a simplified hypothetical example, consider the case of two symbols received at different times. In the first case, the remote transmitter sent symbol 412. During transmission, the symbol was corrupted by error 50 and after receiver processing was detected at position 412'. Since position 412' is within the decision region 46 identified with symbol 412, the receiver correctly determined that symbol 412 had been sent and the symbol was decoded correctly.

In the second case, the remote transmitter sent symbol 414. During transmission, the symbol was corrupted by error 52. After receiver processing, the symbol was detected at position 414'. Since position 414' is within the decision region 46 identified with symbol 415, the receiver incorrectly determined that symbol 415 had been sent and the symbol was decoded in error.

The primary difference between the first and second cases described above is the magnitude of the error that displaced the received symbol from the position at which it had been transmitted. In the first case, the magnitude of the error 50 was small enough that the received symbol 412' correctly remained in the same decision region 46 as symbol 412. In the second case, the magnitude of the error 52 was sufficiently large to move the received symbol 414' into the adjacent decision region 46 of symbol 415, thereby resulting in the decoding error. The threshold magnitude at which a noise sample can potentially cause a decision error is shown in FIG. 2 as dimension 54, the distance between the transmitted point at the center of the decision region 46 and the decision boundaries 48.

Data transmission rates, transmission signal strength, constellation densities, and other parameters can be optimized to condition a transmitted signal such that the received signal is within acceptable parameters even in the presence of many types of noise. The selection of signal transmission parameters is based upon estimation of the stationary noise, and/or non-stationary noise. However, this approach is effective only when accurate estimations can be made. If the estimation is overly conservative, data may be transmitted at rates which are less than the theoretical maximum. If the estimation is overly optimistic, the transmitted data may be subject to errors resulting from the interfering noise.

A basic problem for designers of a data communication system is the estimation of error statistics associated with a received signal. If actual noise in the communication system exceeds the noise level anticipated by the designer, the probability that decoding errors will exceed the desired design probability for the symbol error rate, typically $10^{-6}$ or below (one error in $10^6$ data symbols), will be high. Error estimation, also known as noise estimation hereinafter, can be used to identify potential problems, such as noise sources in a communication system, or to determine the appropriate transmission rates of data in a rate adaptive system. Examples of rate adaptive systems include ADSL (Asymmetric Digital Subscriber Line), RADSL (Rate Adaptive Digital Subscriber Line), MVL (Multiple Virtual Line), Tripleplay™, or the like.

FIG. 3 is a block diagram illustrating one implementation of a prior art receiver 62. The receiver 62 could be implemented as hardware in a chip set, as firmware on a general purpose digital signal processor (DSP), as software residing in memory associated with a central processing unit (CPU), or the like. The receiver 62 can be implemented in a variety of digital communication devices, such as but not limited to, an external modem, a personal computer (PC), a PC modem card, a line card or the like. One skilled in the art will realize that a receiver 62 can be implemented in a variety of manners as is a common practice in the art, and that the prior art receiver 62 of FIG. 3 is provided as an illustrative example.

Describing now in greater detail FIG. 3, an input signal 64 arrives at the receiver 62. After processing the input signal 64, an output signal 66 is transmitted from the receiver 62 to digital equipment (not shown) residing at the CO 22 or the CP 24 (FIG. 1). In addition, an estimate of the received noise 68 is transmitted from receiver 62 to digital equipment (not shown) residing at the CO 22 or CP 24 (FIG. 1) to facilitate rate adaptation, error reporting, or the like. The receiver 62 has a decoder 70, a demapper 72, and an RMS noise estimator 74. Decoder 70 is connected to demapper 72 by line 76 and to RMS noise estimator 74 by line 78. Demapper 72 provides the output signal 66 via line 80. RMS noise estimator 74 provides the noise estimator output signal 68 via line 82. Two output signals are generated by decoder 70. Sliced symbol output signal 84 contains decoded symbols such as symbol 412 (FIG. 2) which are then further processed by demapper 72. Error signal 86 contains error samples such as error 50 and error 52 (FIG. 2) and is used by RMS noise estimator 74 to generate an estimate of the noise. The RMS noise estimator 74 processes the error signal and provides a RMS noise estimator output 68 via line 82. RMS noise estimator output 68 may then be processed in any conventional manner commonly employed in the art. For example, the RMS noise estimator output 68 could be transmitted to a database system for storage and later retrieval. The RMS noise estimator output 68 could be processed by software designed to generate a noise estimator output report (not shown) and which may be displayed in any conventional manner, such as but not limited to, a graphics device, a line printer, an X-Y plotter or the like. Noise estimator output 82 may also be used as an input to a rate adaptation function which may result in an increase or decrease in the rate at which data is sent to receiver 62.

Noise estimation for stationary noise is usually accomplished by measuring the power or the root mean squared (RMS) magnitude of the noise. The power or the magnitude of the noise is then used to estimate the probability of symbol error rates. Noise can be probabilistically described in terms of standard deviation and per unit power, as shown by the graph 90 of FIG. 4. Stationary noise is generally bounded with a classical Gausian distribution, as shown by the dashed line 94. However, the long term average distribution of noise having STS noise components may not be not bounded by a Gausian distribution, as shown by the solid line 96.

FIG. 5 is a graph 102 illustrating the difficulty of estimating noise with prior art methods when STS noise is present with stationary noise. The graph 102 shows a simplified illustrative example sample period with N samples. A first portion 104 is shown, at samples 0–2, where only stationary noise is present. No STS noise is present during this first portion 104. The power $P_1$ of the error signal, consisting of stationary noise only, is shown as being constant.

A second portion 106 is shown where STS noise is present. In this simplified illustrative example at sample M+1, a first stationary noise (STS 1) comes on (a first modem, not shown, is transmitting and inducing a noise signal into the system), which raises the power of the error signal to $P_2$. Then, a second STS noise (STS 2) comes on at M+2 (a second modem is transmitting and inducing a noise signal into the system) raising the power of the error signal to $P_3$. Similarly, STS 3 and STS 4 come on at M+3, further raising the power of the error signal to $P_5$. As the STS noises come on, the power of the error signal increases in this illustrative example. Then, STS 1 is shown to come off at M+7, reducing the power of the error signal to $P_4$. At M+8, STS 2 and STS 3 come off, leaving only STS 4 on. The power of the error signal is then $P_2$. At M+9, all STS noise sources are off, and the power of the error signal is $P_1$ and consists only of stationary noise. In this simplified illustrative example, all STS noise sources remain off through the end of the sample period N, as shown by the portion 108. One skilled in the art will realize that the simplified illustrative example shown in FIG. 5 is equally applicable to other types of non-stationary noise.

With the prior art, data transmission rates might be determined based upon a design power of the error signal having only the stationary noise (no STS noise sources or other non-stationary noise sources present). When modems communicating over adjacent wire pairs begin transmitting and induce noise onto the communication system, the power of the error signal increases. With a plurality of STS noise sources, the actual power of the error signal may significantly exceed the above-described design power of the error signal (the assumed error signal power used to determine data transmission rates). When this situation occurs, the probability of signal errors increases, and performance degradation may occur.

FIG. 6 is a flow chart 112 illustrating one prior art noise estimation method. The method begins with initialization of a predefined sampling period of length N at block 114. The sample number K and the integrated power P are set to zero at block 116. Then, K is incremented at block 118 and the first new sample X is received at block 120. A running total of the integrated power P is calculated by squaring the magnitude of the sample (|X|*|X|) and adding it to the running total P at block 122. The sample number K is then checked to determine if the sampling period N has expired at block 124. If K is less than N, the No condition, then the process returns to block 118. If K is equal to N, the Yes condition, then the running total of the integrated power P is divided by N at block 126 to calculate the average mean power of all samples received during the sampling period N. The average mean power, P/N, is thus calculated and the process ends, as shown at block 128. One skilled in the art will realize that the square root of the calculated mean power is the root mean square (RMS), another valid indicator of noise on the communication circuit.

With this prior art method as described in FIG. 6, if STS or non-stationary noise is absent during all or a portion of the sampling period, data transmission rates will be determined without consideration of the possible effect of STS or non-stationary noise sources. If STS or non-stationary noise occurs on the communication circuit when a modem is receiving data, the probability of decoding errors increases.

Thus, a heretofore unaddressed need exists in the industry for a way to more accurately account for the effect of STS and/or non-stationary noise sources when estimating noise characteristics in a communication system.

SUMMARY OF THE INVENTION

The present invention provides a thresholding noise estimator that resides in a receiver which detects and samples an error signal during a sampling period. In a preferred embodiment when the magnitude of a data sample from the error signal, also known as an error sample, is at least equal to a predefined threshold, that sample is included in the noise estimation calculation. At the end of the sampling period, the computed power for each of the included error samples are averaged. This average power corresponds to an error indicator which quantitatively indicates the power for that portion(s) of an error signal which is at least equal to the threshold. That is, the power of each data sample having a magnitude at least equal to the predefined threshold (i.e., an error sample) is computed, and at the end of the sampling period, the calculated powers are averaged.

An alternative embodiment of the thresholding noise estimator provides for magnitude hysteresis. Similar to the preferred embodiment, the power is calculated for an error sample having a magnitude at least equal to a first predefined threshold. Power for succeeding error samples having a magnitude at least equal to the threshold is calculated. However, once the power calculating process begins, the power of succeeding data samples are calculated until the magnitude of a succeeding data sample drops below a second predefined threshold. Once the magnitude of this succeeding data sample drops below the second predefined threshold, the power calculations are halted. That is, succeeding data samples are defined as error samples until the magnitude of the error signal drops below the second threshold. (Power calculations do not begin again until the magnitude of the data samples again exceeds the first threshold.) At the end of the sampling period, the computed powers are averaged. This average power corresponds to an error indicator which quantitatively indicates the power for the above-described portion(s) of an error signal.

Another alternative embodiment of the thresholding noise estimator provides for time hysteresis. Similar to the preferred embodiment, the power is calculated for an error sample having a magnitude at least equal to a first predefined threshold. Power for succeeding error samples having a magnitude at least equal to the threshold is calculated. However, when the first succeeding data sample having a magnitude below the threshold is detected, the power of succeeding data samples are calculated until the expiration of a predetermined time period (or alternatively, after the detection of a predetermined number of succeeding data samples). Then, the power calculations are halted. That is, succeeding data sample s are defined as error samples until the magnitude of the error signal drops below the threshold and after the expiration of the time period. (Power calculations do not begin again until the magnitude of the data samples again exceed the first threshold.) At the end of the sampling period, the computed powers are averaged. This average power corresponds to an error indicator which quantitatively indicates the power for the above-described portion(s) of an error signal. Alternatively, an embodiment employing time hysteresis may use a predefined number of data samples instead of a predefined time period either being functionally equivalent.

Another alternative embodiment of the thresholding noise estimator provides a combination of magnitude and time hysteresis. The thresholding noise estimator begins calculating the power of error samples upon the detection of a data sample having a magnitude which is at least equal to a predefined first threshold. Power calculations continue until the magnitude of succeeding error samples decrease to less than a predetermined second threshold (magnitude hysteresis). Then, power calculations are further continued until the expiration of a predetermined time period, or, until the detection of a predetermined number of data samples (time hysteresis). At the end of the sampling period, the computed powers are averaged. This average power corresponds to an error indicator which quantitatively indicates the power for the above-described portion(s) of an error signal.

Yet another alternative embodiment of the thresholding noise estimator adds to the scaled averaged power the scaled power of that error sample having the greatest magnitude of the error samples detected during the sampling period (i.e., the peak error sample). The average power for this alternative embodiment may be calculated by any one of the above-mentioned embodiments. This scaled average power plus the scaled power of the peak error sample corresponds to an error indicator which quantitatively estimates the maximum peak power for an error signal which will occur with a given probability.

And another alternative embodiment interleaves the error samples into a predetermined number of sample subsets. Then, the magnitude of the peak error samples from each sample subset are averaged. This averaged peak magnitude is scaled and added to the scaled average power calculated by any one of the above-mentioned embodiments. This scaled average power plus the scaled averaged peak magnitude corresponds to an error indicator which quantitatively estimates the maximum peak power for an error signal which will occur with a given probability.

The thresholding noise estimator may be implemented in a variety of other formats, including program code residing on a computer readable medium.

Other systems, methods, features, and advantages of the thresholding noise estimator will be or become apparent to one with skill in the art upon examination of the following drawings and detailed description. It is intended that all such additional systems, methods, features, and advantages be included within this description, be within the scope of the thresholding noise estimator, and be protected by the accompanying claims.

BRIEF DESCRIPTION OF THE DRAWINGS

The thresholding noise estimator can be better understood with reference to the following drawings. The elements of the drawings are not necessarily to scale relative to each other, emphasis instead being placed upon clearly illustrating the principles of the noise estimator. Furthermore, like reference numerals designate corresponding parts throughout the several views.

Figure 1:
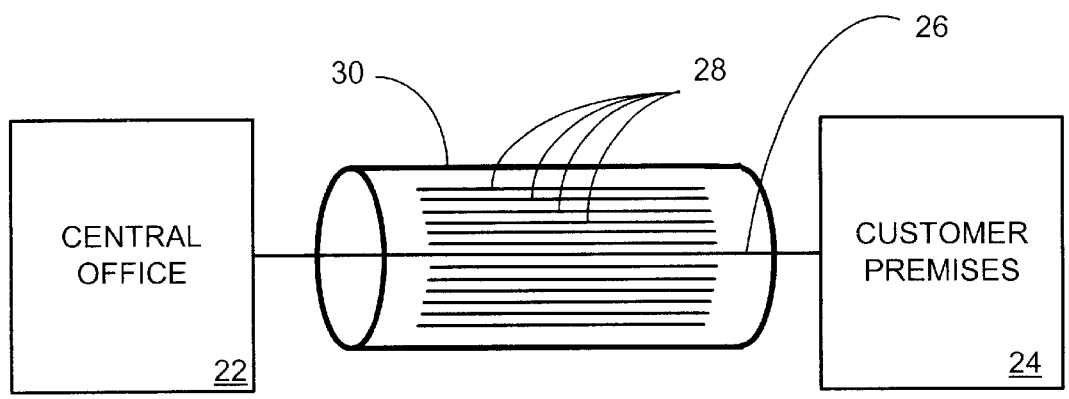
FIG. 1 is a block diagram of a prior art telephony system showing a cable bundle of subscriber loops.
Figure 2:
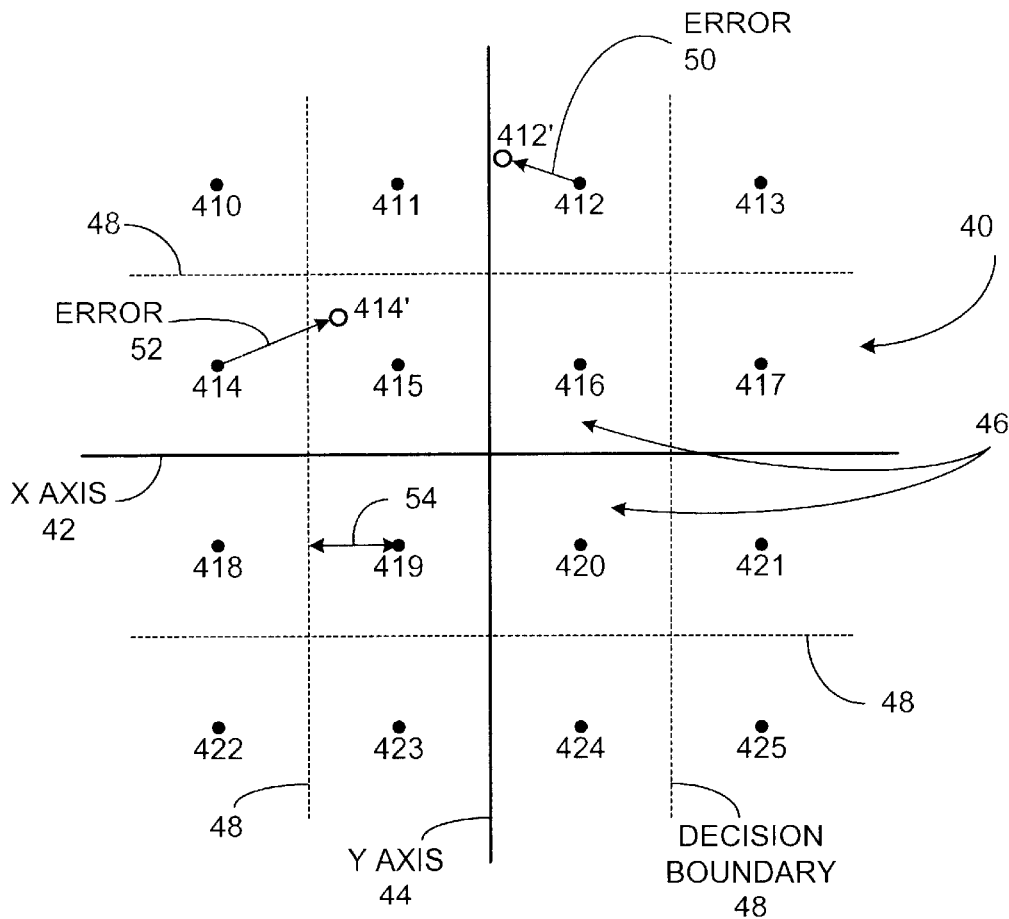
FIG. 2 shows a typical data constellation associated with a signal transmitted over the telephony system of FIG. 1.

Reference will now be made in detail to the description of a thresholding noise estimator as illustrated in the drawings. While the thresholding noise estimator will be described in connection with these drawings, there is no intent to limit the thresholding noise estimator to the embodiment or embodiments disclosed therein. On the contrary, the intent is to cover all alternatives, modifications and equivalents included within the spirit and scope of the thresholding noise estimator as defined by the appended claims.

DETAILED DESCRIPTION

I. Communication Topology

Figure 7:
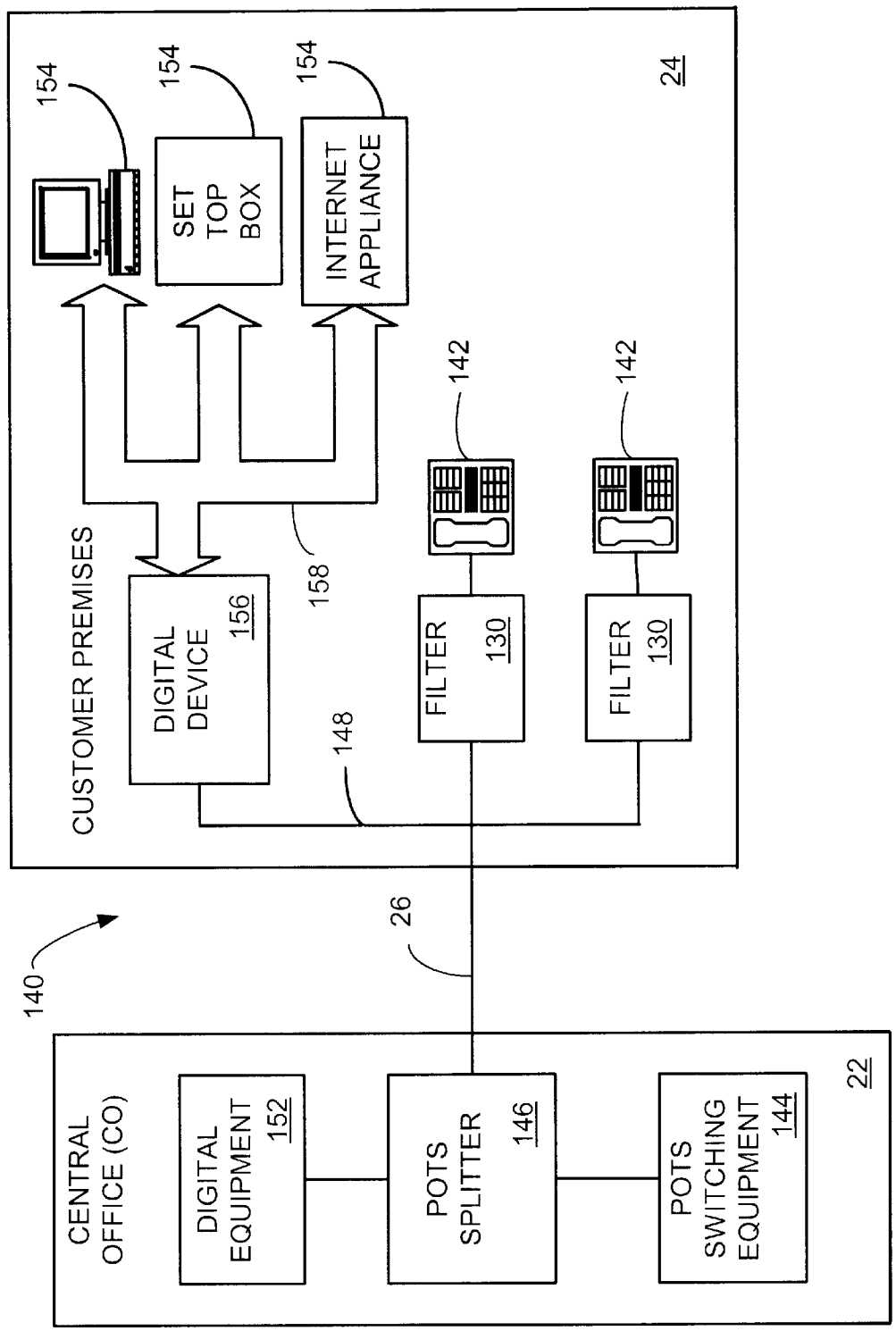
FIG. 7 is a block diagram of the central office and customer premises of FIG. 1 showing additional equipment at the central office and customer premises, including the digital device where the preferred embodiment of the noise estimator resides.

FIG. 7 is a schematic view illustrating the network communication topology in which the thresholding noise estimator resides. FIG. 7 shows a point-to-point telephony and data communication system 140 in which devices employing the thresholding noise estimator reside. One skilled in the art will realize that the thresholding noise estimator applies equally well to multipoint operation. The existing telephony and data communication system 140 includes the telephone company central office (CO) 22 connected to the customer premises (CP) 24 via the subscriber loop 26 (FIG. 1). "Central office" or "CO" can be any site where a subscriber loop 26 connects into the plain old telephone system (POTS) such as a public switched telephone network (PSTN), a private branch exchange (PBX) telephony system, or any other location functionally connecting subscriber loops to a telephony network. The subscriber loop 26 may be any suitable connection for passing electrical signals, but is typically a copper wire pair, as is well known in the art.

Analog communication signals received from remote locations are transmitted to telephones 142, located at CP 24, via POTS switching equipment 144, the POTS splitter. 146, subscriber loop 26, home wiring 148, and the filter 130. Similarly, analog communication signals from the telephone 142 are transmitted to remote locations on the telephony infrastructure (not shown) via the filter 130, home wiring 148, the subscriber loop 26, the POTS splitter 146 and POTS switching equipment 144. A filter 130 may be required to connect the telephones 142 to subscriber loop 26. However, one skilled in the art will realize that the thresholding noise estimator applies equally well to CP systems without filter 130, to CP systems with POTS splitters, to CP "splitterless" systems, or other CP systems commonly employed in the art.

Digital equipment 152 may be installed at the CO 22 to facilitate bidirectional communication of digital data with digital equipment units 154 located at CP 24. To facilitate simultaneous communication of analog communication and transmission of digital data to the CP 24, the POTS switching equipment 144 and the digital equipment 152 may be connected to the subscriber loop 26 through a POTS splitter 146. One skilled in the art will realize that alternative embodiments of the thresholding noise estimator applies equally well to "splitterless" systems. The subscriber loop 26 is often referred to as a digital subscriber line, or DSL. The term subscriber loop, digital subscriber line and DSL are used interchangeably throughout this application and are intended to be equivalent.

Located within the CP 24, as the illustrative example of FIG. 7, may be one or more digital equipment units 154 such as, but not limited to, set top boxes, internet appliances, computers or the like. A digital equipment unit 154 is typically designed to process digital data received from a digital communication system. The use of any such digital equipment unit in association with the thresholding noise estimator is intended to be within the scope of this disclosure and the claims of the thresholding noise estimator.

A digital device 156 is connected to digital equipment unit 154 via an Ethernet 158, other local access network (LAN), or the like. Alternatively, digital device 156 may be contained within digital unit 154. An illustrative example of a digital device 156 would be a modem. The digital device 156 decodes digital data received from the CO digital equipment 152, and transmits the decoded digital data to the digital equipment unit 154. The digital device 156 also encodes digital data received from the digital equipment unit 154 into a digital data format for transmission to the CO digital equipment 152. Modulation schemes used to communicate between CO 22 and CP 24 may include, but are not limited to, carrierless amplitude/phase modulation (CAP), quadrature amplitude modulation (QAM), Discrete MultiTone (DMT), or pulse amplitude modulation (PAM), and are commonly known in the art.

II. Noise Estimator Sensing An Error Signal

Figure 3:
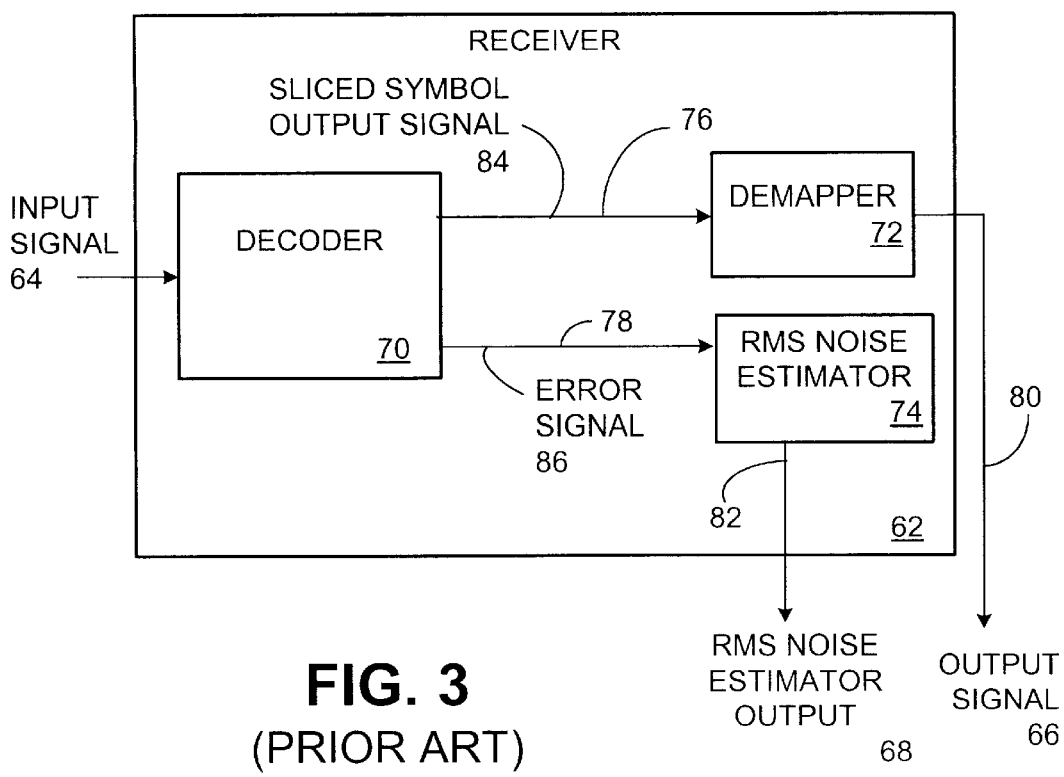
FIG. 3 is a block diagram of a prior art receiver.
Figure 4:
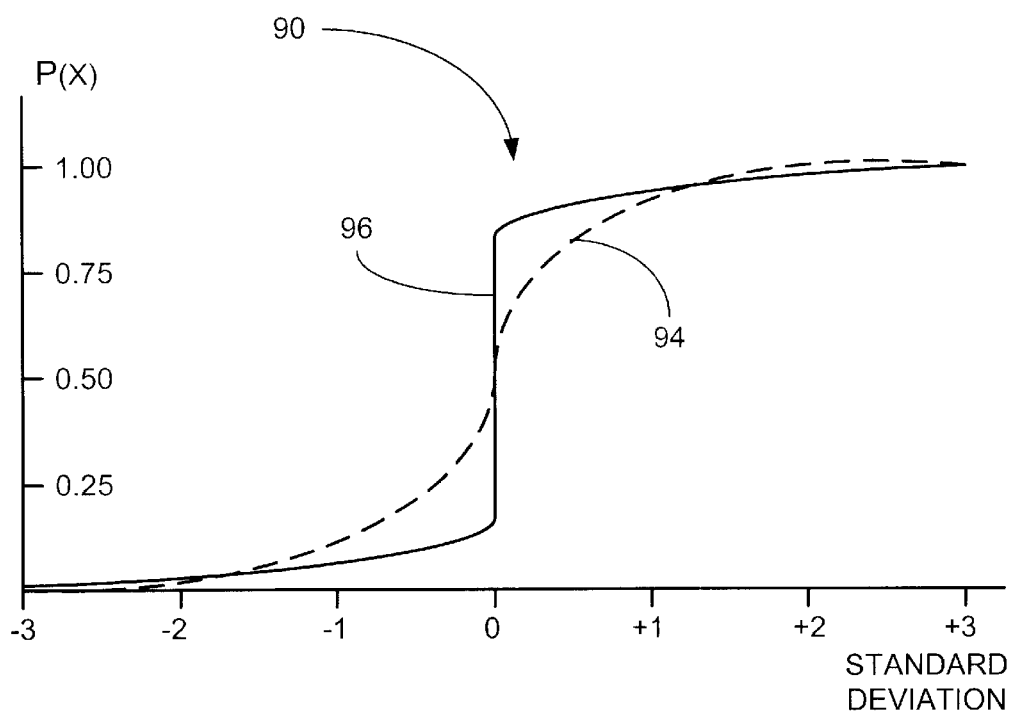
FIG. 4 is a graph showing the Gausian distribution of stationary noise and the probability distribution of noise having STS noise components induced into the subscriber loops of FIG. 1.
Figure 5:
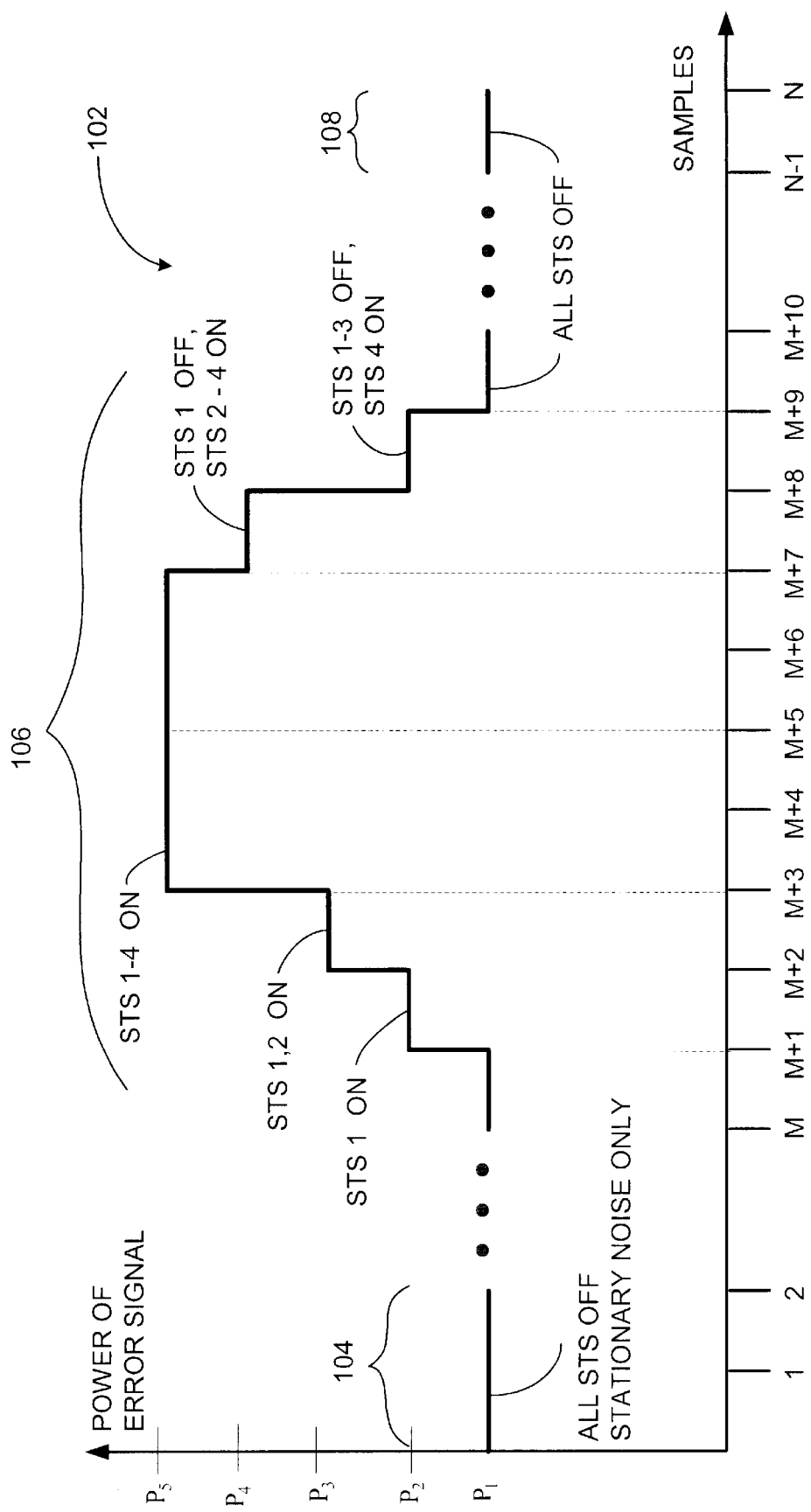
FIG. 5 is an illustrative graph showing power changes in an example error signal with and without STS noise in a subscriber loop of FIG. 1.
Figure 6:
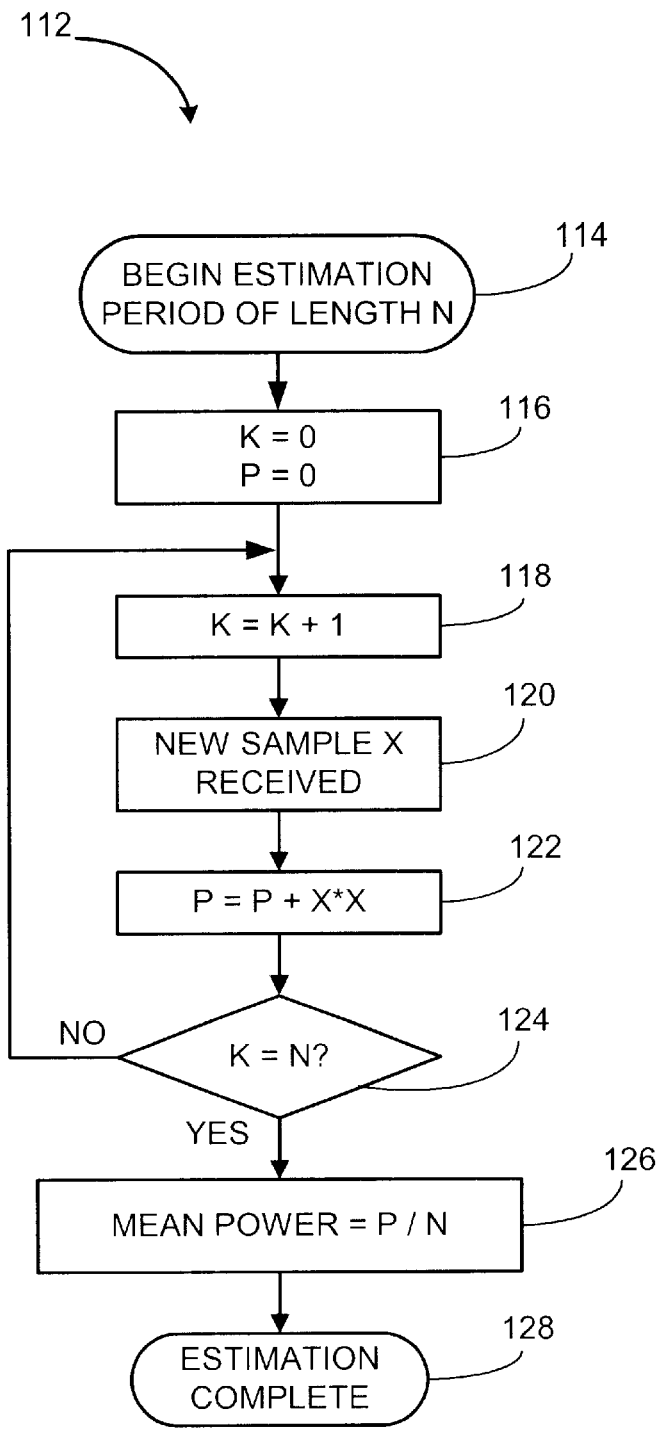
FIG. 6 is a flow chart showing a prior art method of calculating the power of the error signal in a subscriber loop of FIG. 1.
Figure 8:
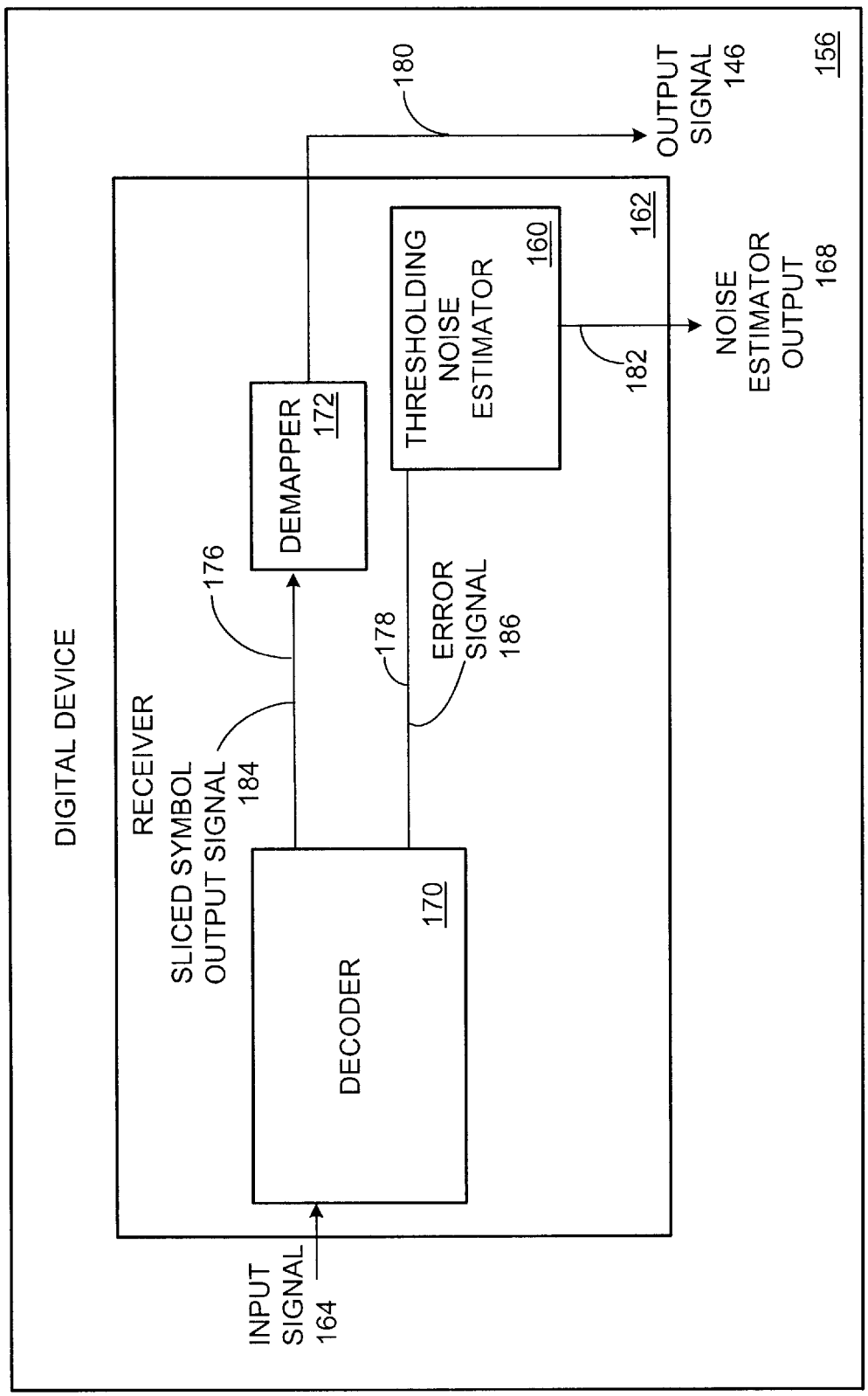
FIG. 8 is a block diagram of a digital device containing a receiver in which the noise estimator resides.

FIG. 8 is a block diagram illustrating the preferred embodiment of a thresholding noise estimator 160. The thresholding noise estimator 160 is shown to reside in a receiver 162. The receiver 162 operates in a similar manner as the prior art receiver 62 shown in FIG. 3. Elements in FIG. 8 that are similar to those in FIG. 3 bear similar reference numerals in that elements in FIG. 8 are labeled 1'XX and similar elements in FIG. 3 are labeled XX. One skilled in the art will realize that many variations and modifications may be made to the above-described preferred embodiment of the thresholding noise estimator 160 and the receiver 162 without departing substantially from the spirit and principles of the thresholding noise estimator 160 as described hereinafter. That is, the principles of the thresholding noise estimator 160 detailed hereinafter are similarly applicable to other variations of digital receivers. Furthermore, alternative embodiments of the thresholding noise estimator 160 may reside outside of receiver 162 without departing substantially from the functionality of a thresholding noise estimator 160.

Typically, receiver 162 and thresholding noise estimator 160 reside in digital device 156 (see also FIG. 7). In the preferred embodiment, digital device 156 is a modem, however, digital device 156 could be any element in a communication system where the appropriate input signals to the thresholding noise estimator, as described hereinafter, are available. Such a nesting of thresholding noise estimator 160 into receiver 162, which is then nestled inside digital device 156, is illustrative of a preferred embodiment of the thresholding noise estimator 160 which may be conveniently assembled and marketed in a unitized package. When the thresholding noise estimator 160 is included in a unitized package having the receiver 162 nestled in digital device 156, the thresholding noise estimator 160 will be readily able to analyze signals passing through digital device 156 and the associated receiver 162. Alternative embodiments of a thresholding noise estimator 160 could reside as a stand alone unit with appropriate connections to a digital device 156 and/or an receiver 162. Any such alternative embodiments of a thresholding noise estimator 160 are intended to be within the scope of this disclosure and the claims of the thresholding noise estimator 160.

The preferred embodiment of the thresholding noise estimator, and the alternative embodiments of the thresholding noise estimator 160 as described hereinafter, are implemented as firmware executed by a processor. However, the preferred embodiment and the alternative embodiments of the thresholding noise estimator may be implemented either as hardware or as a combination of hardware and software. When implemented as hardware, the thresholding noise estimator can be constructed from any commonly employed components as well known in the art, such as but not limited to, Application Specific Integrated Circuits (ASICs), Field Programmable Gate Arrays (FPGAs), or discrete logic components. When implemented as software, the thresholding noise estimator can be implemented on computer software or other computer-readable medium. Any such implementations of the thresholding noise estimator are intended to be within the scope of this disclosure and protected by the accompanying claims for the thresholding noise estimator.

Describing now in greater detail FIG. 8, an input signal 164 arrives at the receiver 162 and is processed in a manner similar to that described for the receiver 62 (FIG. 3). Since signal processing in receiver 162 is substantially similar to the signal processing of receiver 62 (FIG. 3), the processing of a signal by receiver 162 and the functioning of each of the elements of the receiver 162 are not described in detail herein. Rather, differences between receiver 162 and receiver 62 (FIG. 3) are described in detail with respect to the functioning of thresholding noise estimator 160. Thresholding noise estimator 160 receives error signal 186 via line 178. The thresholding noise estimator 160 processes the error signal, in the manner described hereinafter, and provides a thresholding noise estimator output 168 via line 182. Thresholding noise estimator output 168 may then be processed in any conventional manner commonly employed in the art. For example, the thresholding noise estimator output 168 could be transmitted to a database system for storage and later retrieval. The thresholding noise estimator output 168 could be processed by software designed to generate a thresholding noise estimator output report (not shown) and which may be displayed in any conventional manner, such as but not limited to, a graphics device, a line printer, an X-Y plotter or the like. Thresholding noise estimator output 168 may also be used as an input to a rate adaptation function in which digital device 156 may request that digital equipment 152 (FIG. 7) either increase or decrease the rate at which it transmits data to receiver 162.

III. Preferred Embodiment Flow Chart

Figure 9:
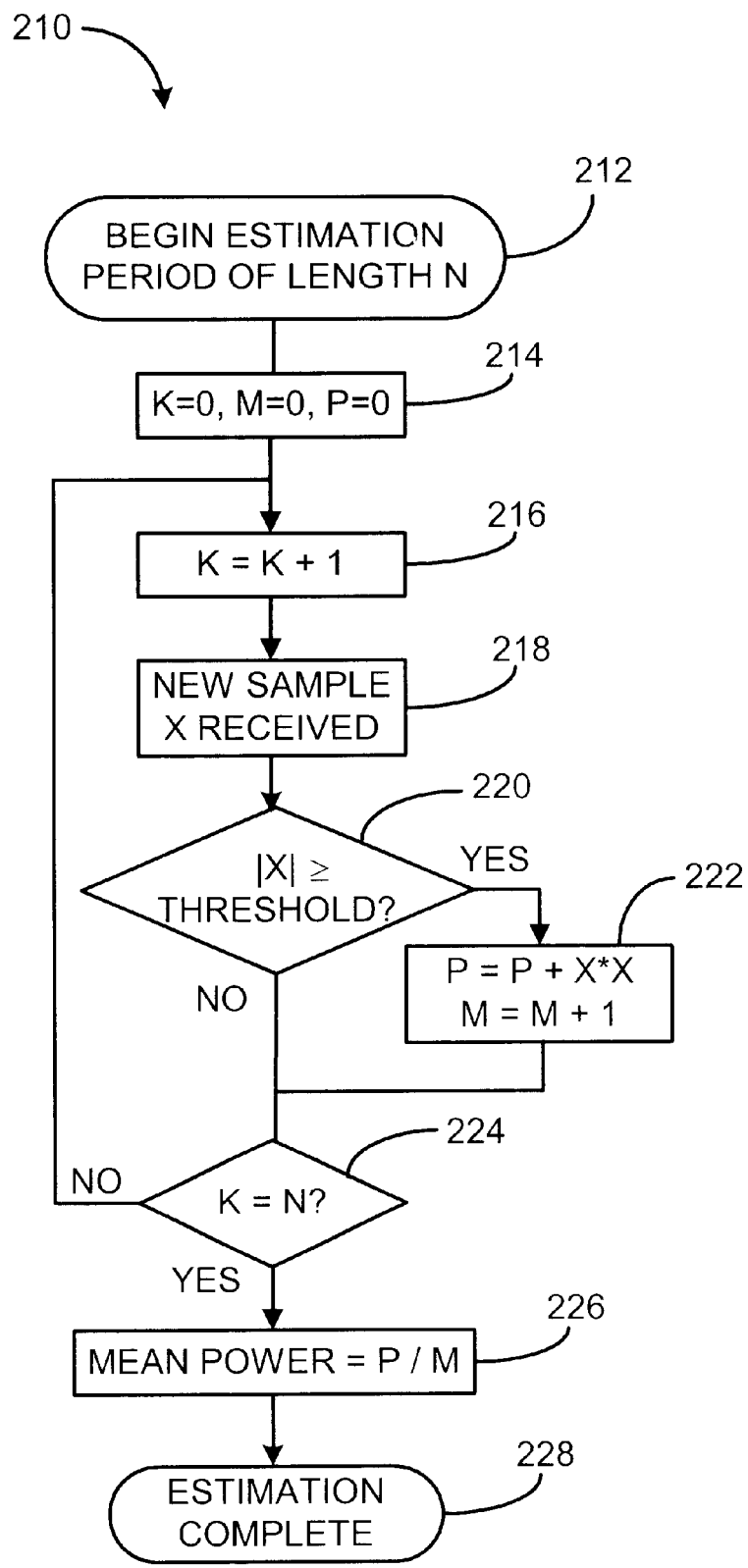
FIG. 9 is a flow chart showing the operation of the noise estimator illustrated in FIG. 8.

FIG. 9 is a flow chart 210 illustrating the operation of the thresholding noise estimator 160 (FIG. 8) when implemented as software or other computer-readable medium. The flow chart of FIG. 9 shows the architecture, functionality, and operation of a possible implementation of the software for implementing the thresholding noise estimator 160 (FIG. 8). In this regard, each block may represent a module, segment, or portion of code, which comprises one or more executable instructions for implementing the specified logical function(s). It should also be noted that in some alternative implementations, the functions noted in the blocks may occur out of the order noted in FIG. 9 or may include additional functions without departing significantly from the functionality of the thresholding noise estimator 160 (FIG. 8). For example, two blocks shown in succession in FIG. 9 may in fact be executed substantially concurrently, the blocks may sometimes be executed in the reverse order, or some of the blocks may not be executed in all instances, depending upon the functionality involved, as will be further clarified hereinbelow.

The method begins with initialization of a predefined sampling period N at block 212. The sample number K, error sample counter M, and the integrated power P, are set to zero at block 214. Then, K is incremented at block 216 and the first new data sample X is received at block 218. In the preferred embodiment of the thresholding noise estimator 160 (FIG. 8), a data sample is received from decoder 170 over connection 178 and is a data sample of error signal 186. Hereinafter, the term sample and the phrase data sample are used interchangeably and are intended to be equivalent. Hereinafter, the term error sample will be used to refer to any data sample for which the power of that data sample is calculated, as described in the following preferred embodiment and alternative embodiments. One skilled in the art will realize that data sample X may be real, with positive and negative polarities, or that it may be complex, with real and imaginary components, or that it may be an n-dimensional vector with more than 2 dimensions. Alternative embodiments of a thresholding noise estimator may detect a subset of one or more dimensions of an n-dimensional data sample (n>1) which may be applied to the process shown in FIG. 9.

Next, the magnitude of sample X is compared with the predefined threshold at block 220. If the magnitude of sample X is at least equal to the threshold, the Yes condition, then a running total of the integrated power P is calculated. In the preferred embodiment, power of the sample is calculated by squaring the magnitude of the sample ($|X|*|X|$) and adding it to the integrated power P at block 222. In addition, error sample counter M is incremented at block 222.

The sample number K is then checked to determine if the sampling period N has expired at block 224. If at block 220 the magnitude of the sample is less than the threshold, the No condition, then the test K=N? of block 224 is performed.

At block 224, if K is less than N, the No condition, then the process returns to block 216 because the sampling period has not yet expired. If K is equal to N, the Yes condition, then the sampling period has expired and the running total of the power P is divided by M at block 226 to calculate the mean power of only the samples received which exceeded the threshold during the sampling period N. The mean power, also known as the average power, for the samples exceeding the threshold, P/M, is thus calculated and the process ends, as shown at block 228. The terms mean power and average power are equivalent and used interchangeably hereinafter for the preferred embodiments and the alternative embodiments described below.

Alternative embodiments of the thresholding noise estimator employing the process shown in FIG. 8 may calculate the power of the sample by any alternative methods without departing substantially from the functionality of the thresholding noise estimator. In other alternative embodiments, the instantaneous power of sample X ($|X|*|X|$) may be compared with a predefined power threshold at block 220. In yet other alternative embodiments, a running total of summed magnitudes may be calculated in place of the running total of integrated power generated by squaring the magnitudes in block 222. In yet other alternative embodiments, the power P may be integrated until a fixed number of samples M=M1 has been included in the integrated power, instead of integrating until a fixed number of samples K=N has been tested. Any such alternative embodiments of a thresholding noise estimator are intended to be within the scope of this disclosure and be protected by the accompanying claims for the thresholding noise estimator.

The process illustrated in the flow chart 210 of FIG. 9 provides a method for calculating the power of portions of an error signal which have a magnitude at least equal to the predefined threshold. By selecting a threshold which will detect levels of noise greater than the stationary noise, higher levels of noise, such as but not limited to STS noise, can be detected and measured. The calculated power of the error signal having higher levels of noise, such as but not limited to STS noise, can then be used to bias settings for data transmission rates over the communication system. One skilled in the art will realize that the square root of the calculated mean power is the root mean square (RMS). RMS is another valid indicator of the power of noise on the communication circuit which could be used to determine data transmission rates, is equally applicable to an embodiment of the thresholding noise estimator 160 (FIG. 8).

IV. Flow Chart of Thresholding Noise Estimator With Magnitude Hysteresis

Figure 10:
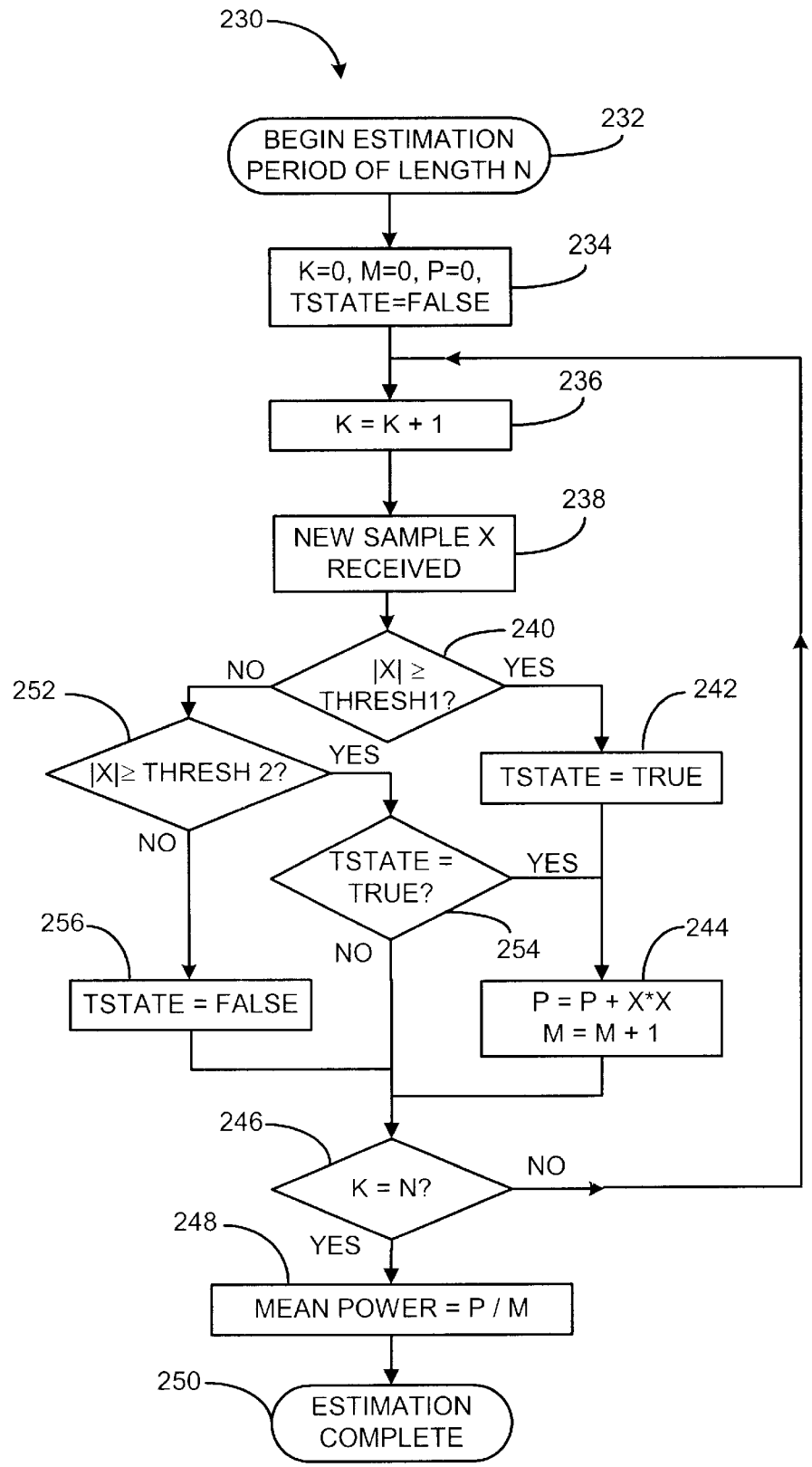
FIG. 10 is a flow chart showing the operation of an alternative embodiment of the noise estimator having magnitude hysteresis.

The process illustrated in the flow chart 210 of FIG. 9 can be enhanced with the addition of magnitude hysteresis, as shown in the flow chart of FIG. 10. Referring now to FIG. 10, shown is a flow chart 230 illustrating the method of calculating power of the error signal with thresholding and magnitude hysteresis. Additionally, the flow chart 230 of FIG. 10 is also applicable to an embodiment of the thresholding noise estimator 160 (FIG. 8) implemented on computer software or other computer-readable medium. The flow chart of FIG. 10 shows the architecture, functionality and operation of a possible implementation of the software for implementing the thresholding noise estimator 160 (FIG. 8). In this regard, each block may represent a module, segment or portion of code, which comprises one or more executable instructions for implementing the specified logical function. It should also be noted that in some alternative implementations, the functions noted in the blocks may occur out of the order noted in FIG. 9 or may include additional functions without departing significantly from the functionality of the thresholding noise estimator 160 (FIG. 8). For example, two blocks shown in succession in FIG. 9 may in fact be executed substantially concurrently, the blocks may sometimes be executed in reverse order, or some of the blocks may not be executed in all instances, depending on the functionality involved as will be further clarified hereinbelow.

The method begins with initialization of a predefined sampling period N at block 232. The sample number K, error sample number M, and the integrated power, P, are set to zero at block 234. Also, test state TSTATE is set to FALSE. In the alternative embodiment of the thresholding noise estimator 160 (FIG. 8), a data sample is received from decoder 170 over connection 178 and is a data sampling of error signal 186.

Then, K is incremented at block 236 and the first new sample X is received at block 238. Next, the magnitude of sample X is compared with the predefined first threshold at block 240. If the magnitude of sample X is at least equal to the first threshold (THRESH1), the Yes condition, TSTATE is set to TRUE at block 242. Then a running total of the integrated power P is calculated. In this alternative embodiment, the power of the sample is calculated by squaring the magnitude of the sample ($|X|*|X|$) and adding it to the integrated power P at block 244. In addition, error sample counter M is incremented at block 244.

The sample number K is then checked to determine if the sampling period N has expired at block 246.

At block 246, if K is less than N, the No condition, then the process returns to block 236 because the sampling period has not yet expired. If K is equal to N, the Yes condition, then the sampling period has expired and the running total of the power P is divided by M at block 248 to calculate the mean power of only the samples collected at block 244 during the sampling period N. The mean power for the samples collected at block 244, P/M, is thus calculated and the process ends, as shown at block 250.

If at block 240 the sample does not exceed the first threshold, then the magnitude of the sample is compared to a predefined second threshold (THRESH2) at block 252. If the sample is at least equal to the second threshold, the Yes condition, then the state of TSTATE is checked at block 254. If TSTATE has been set to TRUE, then the Yes condition of block 254 is satisfied and the power of the sample is calculated and is added to the integrated power P at block 244 in the previously described manner (M is also incremented). Processing then continues in the above-described manner.

However, if at block 254 TSTATE is not true (false), the No condition, then the power of the sample is not calculated (and therefore, is not added to the integrated power). Instead, the process continues to block 246 in the manner previously described.

If at block 252 the magnitude of the sample is less than the second threshold, the No condition, TSTATE is set to FALSE at block 256. Processing then continues to block 246 in the manner previously described.

Alternative embodiments of the thresholding noise estimator employing the process shown in FIG. 10 may calculate the power of the sample by any alternative methods without departing substantially from the functionality of the thresholding noise estimator. In other alternative embodiments, the instantaneous power of sample X ($|X|*|X|$) may be compared with predefined power thresholds at block 240 and block 252. In yet other alternative embodiments, a running total of summed magnitudes may be calculated in place of the running total of integrated power generated by squaring the magnitudes in block 244. In yet other alternative embodiments, the power P may be integrated until a fixed number of samples M=M1 has been included in the integrated power, instead of integrating until a fixed number of samples K=N has been tested. Any such alternative embodiments of a thresholding noise estimator are intended to be within the scope of this disclosure and be protected by the accompanying claims for the thresholding noise estimator.

The process illustrated in the flow chart 230 of FIG. 10 provides a method for calculating the power of the portions of an error signal which have a magnitude at least equal to a first predefined threshold, and then to continue collecting data samples until the magnitude of the error signal drops below the second threshold. By selecting the first and second thresholds to detect levels of noise greater than the stationary noise, higher levels of noise, such as but not limited to STS noise, can be detected and measured. Like the process described in FIG. 9, the calculated power of the error signal having higher level noise components can then be used to bias settings for data transmission rates over the communication system. One skilled in the art will realize that the square root of the calculated mean power is the root mean square (RMS). RMS is another valid indicator of the power of noise on the communication circuit which could be used to determine data transmission rates, and is equally applicable to an alternative embodiment of the thresholding noise estimator 160 (FIG. 8).

V. Flow Chart of Thresholding Noise Estimator With Time Hysteresis

Figure 11:
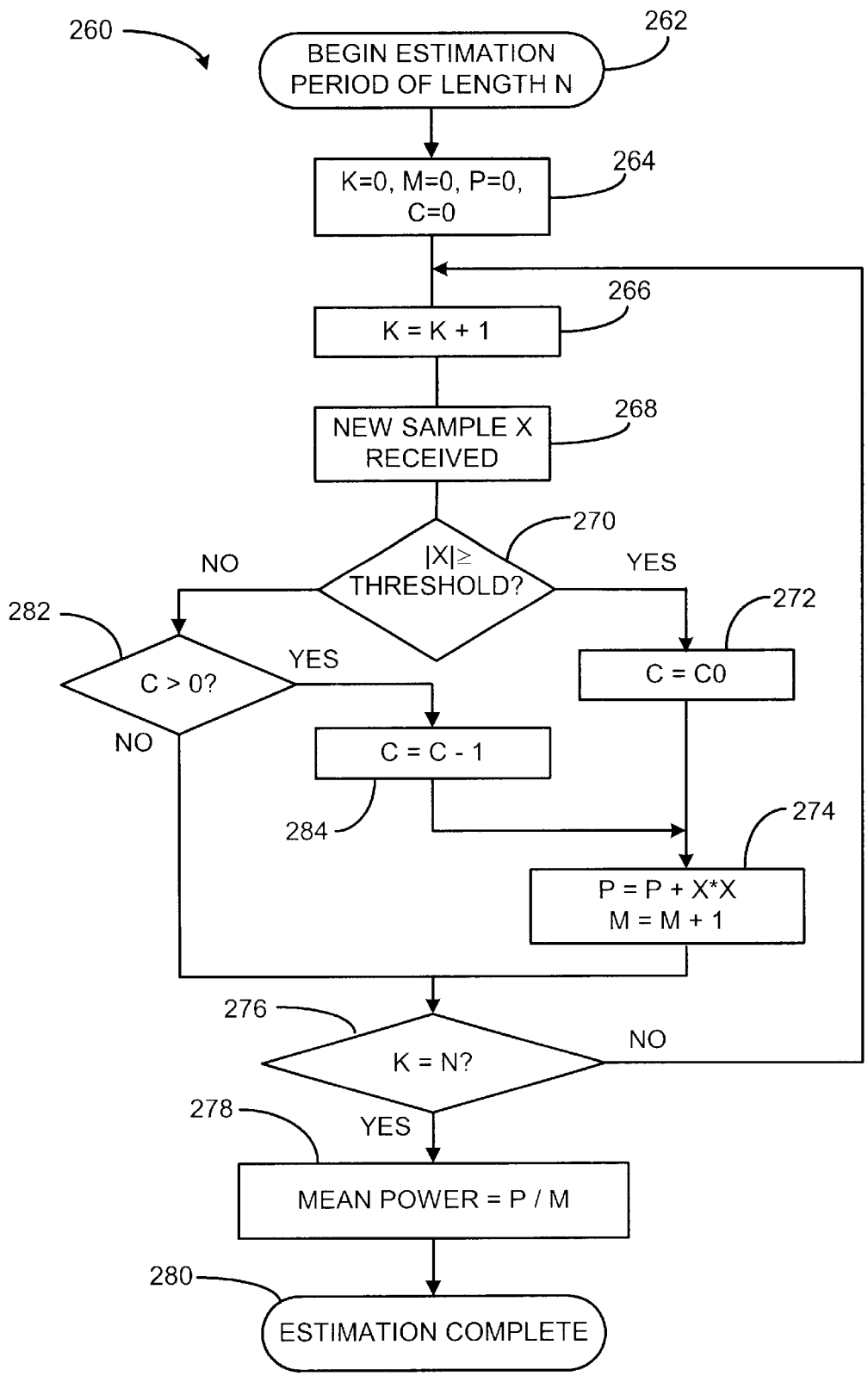
FIG. 11 is a flow chart showing the operation of an alternative embodiment of the noise estimator having time hysteresis.

The process illustrated in the flow chart 210 of FIG. 9 can be enhanced with the addition of time hysteresis, as shown in the flow chart of FIG. 11. Referring now to FIG. 11, shown is a flow chart 260 illustrating the method of calculating power of the error signal with time hysteresis. Additionally, the flow chart 260 of FIG. 11 is also applicable to an embodiment of the thresholding noise estimator 160 (FIG. 8) implemented on computer software or other computer-readable medium. In this regard, each block may represent a module, segment or portion of code, which comprises one or more executable instructions for implementing the specified logical function. It should also be noted that in some alternative implementations the functions noted in the blocks may occur out of the order noted in FIG. 11, or may include additional functions without departing substantially from the overall functionality to be achieved. For example, two blocks shown in succession in FIG. 11 may, in fact, be executed substantially concurrently, the blocks may sometimes be executed in reverse order, or some of the blocks may not be executed in all instances, depending on the functionality involved, as will be further clarified herein below.

The method begins with a predefined sampling period N at block 262. The sample number K, error sample number M, integrated power P, and the clock C, are set to zero at block 264. Then, K is incremented at block 266 and the first new data sample X is received at block 268. In the alternative embodiment of the thresholding noise estimator 160 (FIG. 8), a data sample is received from decoder 170 over connection 178 and is a data sampling of error signal 186.

Next, the magnitude of sample X is compared with the predefined threshold at block 270. If the magnitude of sample X is at least equal to the threshold, the Yes condition, the clock C is set to a predefined value C0 at block 272. Then a running total of the integrated power P is calculated. In this alternative embodiment, power of the sample is calculated by squaring the magnitude of the sample ($|X|*|X|$) and adding it to the integrated power P at block 274. In addition, error sample counter M is incremented at block 274.

The sample number K is then checked to determine if the sampling period N has expired at block 276.

At block 276, if K is less than N, the No condition, then the process returns to block 266 because the sampling period has not yet expired. If K is equal to N, the Yes condition, then the sampling period has expired and the integrated power P is divided by M at block 278 to calculate the mean power of only the samples collected at block 274 during the sampling period N. The mean power for the samples collected at block 274, P/M, is thus calculated and the process ends, as shown at block 280.

If at block 270 the sample does not exceed the threshold, then the clock is checked to see if the clock value is greater than zero at block 282. If the clock value is greater than zero, the Yes condition, then the clock value is decremented at block 284. Then processing continues to block 274 and continues in the above-described manner.

If the clock value is not greater than zero then the No condition of block 282 is satisfied and processing continues to block 276 and continues in the above-described manner.

Alternative embodiments of the thresholding noise estimator employing the process shown in FIG. 11 may calculate the power of the sample by any alternative methods without departing substantially from the functionality of the thresholding noise estimator. In other alternative embodiments, the instantaneous power of sample X ($|X|*|X|$) may be compared with a predefined power threshold at block 270. In yet other alternative embodiments, a running total of summed magnitudes may be calculated in place of the running total of integrated power generated by squaring the magnitudes in block 274. In yet other alternative embodiments, the power P may be integrated until a fixed number of samples M=M1 has been included in the integrated power, instead of integrating until a fixed number of samples K=N has been tested. Any such alternative embodiments of a thresholding noise estimator are intended to be within the scope of this disclosure and be protected by the accompanying claims for the thresholding noise estimator.

The process illustrated in the flow chart 260 of FIG. 11 provides a method for calculating the power of portions of an error signal which have a magnitude at least equal to a predefined threshold, and then to continue calculating the power of data samples until the expiration of a timing period. Like the process described in FIG. 9, the calculated power of the error signal having higher levels of noise, such as but not limited to STS noise, can then be used to bias settings for data transmission rates over the communication system. One skilled in the art will realize that the square root of the calculated mean power is the root mean square (RMS). RMS is another valid indicator of the power of noise on the communication circuit which could be used to determine data transmission rates, and is equally applicable in an alternative embodiment of the thresholding noise estimator 160 (FIG. 8).

Figure 12:
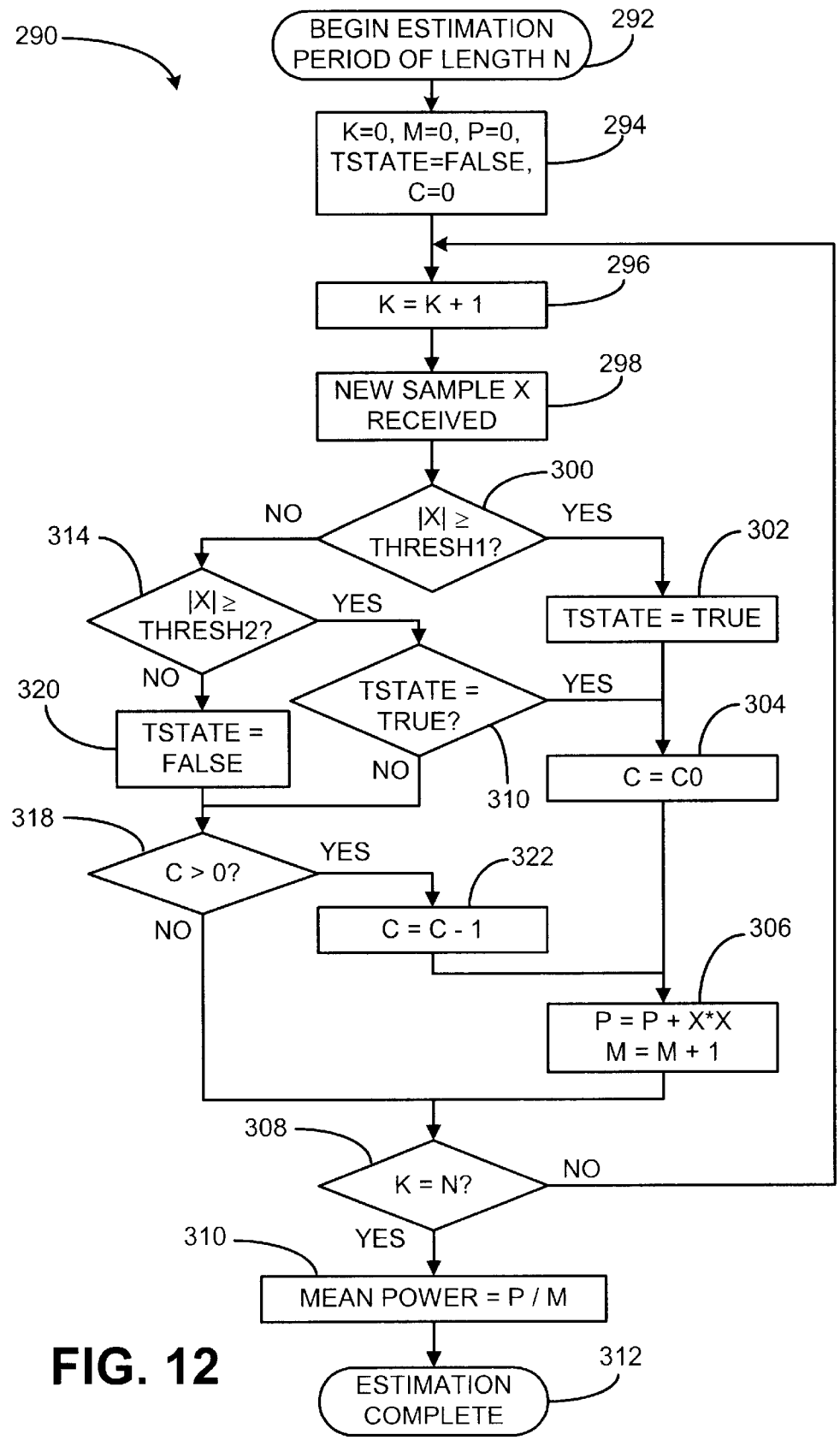
FIG. 12 is a flow chart showing the operation of an alternative embodiment of the noise estimator having magnitude and time hysteresis.

VI. Flow Chart of Thresholding Noise Estimator With Magnitude and Time Hysteresis The process illustrated in the flow chart 210 of FIG. 9 can be enhanced with the addition of magnitude and time hysteresis, as shown in the flow chart of FIG. 12. Referring now to FIG. 12, shown is a flow chart 290 illustrating the method of calculating power of the error signal with thresholding, magnitude hysteresis and time hysteresis. Additionally, the flow chart 290 of FIG. 12 is also applicable to an embodiment of the thresholding noise estimator 160 (FIG. 8) implemented on computer software or other computer-readable medium. In this regard, each block may represent a module, segment or portion of code, which comprises one or more executable instructions for implementing the specified logical function. It should also be noted that in some alternative implementations the functions noted in the blocks may occur out of the order noted in FIG. 12, or may include additional functions without departing substantially from the overall functionality to be achieved. For example, two blocks shown in succession in FIG. 12 may, in fact, be executed substantially concurrently, the blocks may sometimes be executed in reverse order, or some of the blocks may not be executed in all instances, depending on the functionality involved, as will be further clarified herein below.

The method begins with a predefined sampling period N at block 292. The sample number K, error sample number M, integrated power P, and the clock C, are set to zero at block 294. Also, test state TSTATE is set to FALSE. Then, K is incremented at block 296 and the first new data sample X is received at block 298. In the alternative embodiment of the thresholding noise estimator 160 (FIG. 8), a data sample is received from decoder 170 over connection 178 and is a data sampling of error signal 186.

Next, the magnitude of sample X is compared with the first predefined threshold (THRESH1) at block 300. If the magnitude of sample X is at least equal to the first threshold, the Yes condition, TSTATE is set to TRUE at block 302. Then, the clock C is set to a predefined value C0 at block 304. Next, a running total of the integrated power P is calculated. In this alternative embodiment, power of the sample is calculated by squaring the magnitude of the sample ($|X|*|X|$) and adding it to the integrated power P at block 306. In addition, error sample counter M is incremented at block 306.

The sample number K is then checked to determine if the sampling period N has expired at block 308.

At block 308, if K is less than N, the No condition, then the process returns to block 296 because the sampling period has not yet expired. If K is equal to N, the Yes condition, then the sampling period has expired and the integrated power P is divided by M at block 310 to calculate the mean power of only the samples collected at block 306 during the sampling period N. The mean power for the samples collected at block 306, P/M, is thus calculated and the process ends, as shown at block 312.

If at block 300 the magnitude of the sample does not exceed the first threshold, then the magnitude of the sample is compared to a second threshold (THRESH2) at block 314. If the magnitude of the sample is at least equal to the second threshold, the Yes condition, then the state of TSTATE is checked at block 316. If TSTATE has been set to TRUE, then the Yes condition of block 316 is satisfied, and the clock C is set to a predefined value C0 at block 304 and the sample is added to the integrated power at block 306 in the previously described manner (M is also incremented). Processing then continues in the above-described manner.

However, if at block 316 TSTATE is not true (false), the No condition, then the sample is not added to the running total of the power. Instead, the process continues to block 318.

If at block 314 the magnitude of the sample is less than the second threshold, the No condition, TSTATE is set to FALSE at block 320. Processing then continues to block 318.

At block 318, the clock is checked to see if the clock value is greater than zero. If the clock value is greater than zero, the Yes condition, then the clock value is decremented at block 322. Then processing continues to block 306 and continues in the above-described manner.

If the clock value is not greater than zero, then the No condition of block 318 is satisfied and processing continues to block 308 and continues in the above-described manner.

Alternative embodiments of the thresholding noise estimator employing the process shown in FIG. 12 may calculate the power of the sample by any alternative methods without departing substantially from the functionality of the thresholding noise estimator. In other alternative embodiments, the instantaneous power of sample X ($|X|*|X|$) may be compared with a predefined power thresholds at block 300 and at block 314. In yet other alternative embodiments, a running total of summed magnitudes may be calculated in place of the running total of integrated power generated by squaring the magnitudes in block 306. In yet other alternative embodiments, the power P may be integrated until a fixed number of samples M=M1 has been included in the integrated power, instead of integrating until a fixed number of samples K=N has been tested. Any such alternative embodiments of a thresholding noise estimator are intended to be within the scope of this disclosure and be protected by the accompanying claims for the thresholding noise estimator.

The process illustrated in the flow chart 290 of FIG. 12 provides a method for calculating the power of the error signal when the magnitude of the error signal is at least equal to a predefined first threshold, and then to continue collecting the power of data samples until the expiration of a timing period which begins after the magnitude of the error signal decreases to below a second predefined threshold. Like the process described in FIG. 9, the calculated power of the error signal having higher levels of noise, such as but not limited to STS noise, can then be used to bias settings for data transmission rates over the communication system. One skilled in the art will realize that the square root of the calculated mean power is the root mean square (RMS). RMS is another valid indicator of noise on the communication circuit which could be used to determine data transmission rates, and is equally applicable to an alternative embodiment of the thresholding noise estimator 160 (FIG. 8).

Figure 13:
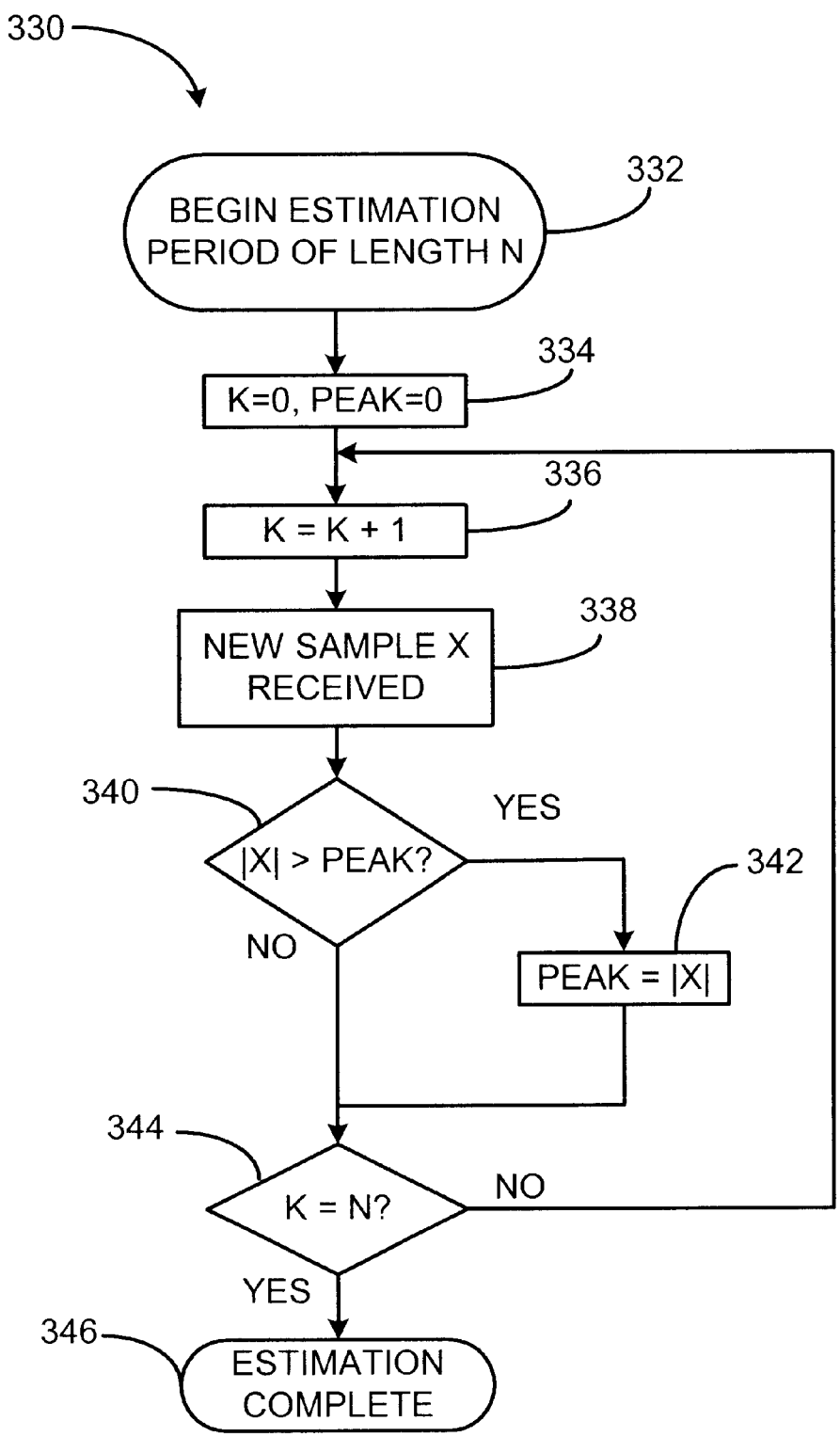
FIG. 13 is a flow chart showing the operation of the noise estimator determining peak power of the error signal of FIG. 5.

VII. Flow Chart of Thresholding Noise Estimator Determining Peak Magnitude of the Error Signal Referring now to FIG. 13, shown is a flow chart 330 illustrating the method of determining the peak magnitude of the error signal. Additionally, the flow chart 330 of FIG. 13 is also applicable to an embodiment of the thresholding noise estimator 160 (FIG. 8) implemented on computer software or other computer-readable medium. In this regard, each block may represent a module, segment or portion of code, which comprises one or more executable instructions for implementing the specified logical function. It should also be noted that in some alternative implementations the functions noted in the blocks may occur out of the order noted in FIG. 13, or may include additional functions without departing substantially from the overall functionality to be achieved. For example, two blocks shown in succession in FIG. 13 may, in fact, be executed substantially concurrently, the blocks may sometimes be executed in reverse order, or some of the blocks may not be executed in all instances, depending on the functionality involved, as will be further clarified herein below.

The method begins with a fixed sampling period N at block 332. The sample number K, and the peak power, PEAK, are set to zero at block 334. Then, K is incremented at block 336 and the first new data sample X is received at block 338. In the alternative embodiment of the thresholding noise estimator 160 (FIG. 8), a data sample is received from decoder 170 over connection 178 and is a data sampling of error signal 186.

Next, the magnitude of sample X is compared with the magnitude of the current peak data sample at block 340. If the magnitude of sample X is greater than the magnitude of the current peak data sample, the Yes condition, then the current peak data sample PEAK is set to the magnitude of sample X at block 342. However, if the magnitude of sample X is not greater than the magnitude of the current peak data sample, the No condition, the process proceeds to block 344.

At block 344, the sample number K is then checked to determine if K=N (if the fixed sampling period N has expired). At block 344, if K is less than N, the No condition, then the process returns to block 336 because the fixed sampling period has not yet expired. If K is equal to N, the Yes condition, then the fixed sampling period has expired and the process ends, as shown at block 346.

The process illustrated in the flow chart 330 of FIG. 13 provides a method for determining the magnitude of that data sample having the greatest magnitude detected during the sampling period. By determining the peak magnitude of the error signal, higher levels of noise, such as but not limited to STS noise, can be detected and measured. The peak magnitude of the error signal can then be used to bias settings for data transmission rates over the communication system.

One skilled in the art will realize that alternatively, the peak squared magnitude (or peak instantaneous power) could be determined in alternative embodiments by the method shown in FIG. 13 without departing substantially from the overall functionality to be achieved.

Figure 14:
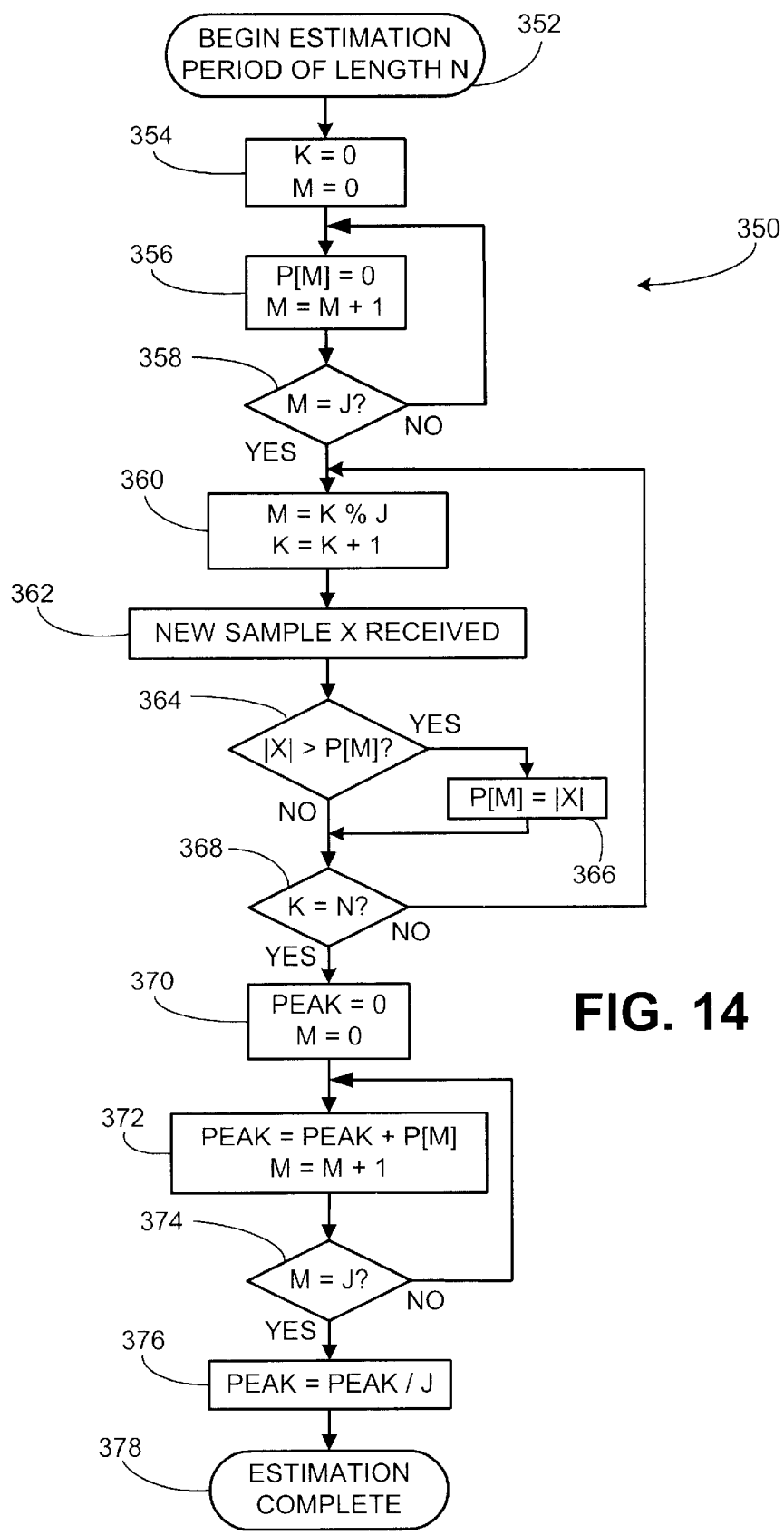
FIG. 14 is a flow chart showing the operation of the noise estimator determining an averaged interleaving peak power of the error signal of FIG. 5.

VIII. Flow Chart of Thresholding Noise Estimator Determining Average Peak Magnitude of an Error Signal Referring now to FIG. 14, shown is a flow chart 350 illustrating an alternative embodiment of a thresholding noise estimator 160 (FIG. 8) for determining the magnitude of an average of interleaved data samples during a sampling period. Additionally, the flow chart 350 of FIG. 14 is also applicable to an embodiment of the thresholding noise estimator 160 (FIG. 8) implemented on computer software or other computer-readable medium. In this regard, each block may represent a module, segment or portion of code, which comprises one or more executable instructions for implementing the specified logical function. It should also be noted that in some alternative implementations the functions noted in the blocks may occur out of the order noted in FIG. 14, or may include additional functions without departing substantially from the overall functionality to be achieved. For example, two blocks shown in succession in FIG. 14 may, in fact, be executed substantially concurrently, the blocks may sometimes be executed in reverse order, or some of the blocks may not be executed in all instances, depending on the functionality involved, as will be further clarified herein below.

The method begins with a fixed sampling period N at block 352. To determine an average magnitude of interleaved peak data samples, a predefined number J of interleaved sample subsets are used. As each data sample is detected, its magnitude is compared to the peak magnitude value stored for the sample subset to which it belongs. The correct sample subset M for each data value is determined by the value of the sample number K for that sample and the number of sample subsets J using the modulus function as shown in the equation below. The modulus function, indicated by the symbol % in the equation below and in FIG. 14, returns the remainder generated by integer division of a dividend K by a divisor J.

As the first sample (K=0) is detected, the sample is applied to the first interleaved sample subset (M=0). In this alternative embodiment of the thresholding noise estimator 160 (FIG. 8), a data sample is received from decoder 170 over connection 178 and is a data sampling of error signal 186.

Then, the second sample is applied to the second subset (M=1), and so on through the first J samples. Then, (J+1)th sample is applied to the first subset (M=0). The (J+2)th sample is applied to the second subset (M=1). Subsequent data samples are processed accordingly. Thus, the interleaved sample subset M to which a data sample with sample number K will be applied can be easily determined by the modulus equation below.

$$M = K \% J$$

For example, the ninth sample (K=8), as shown below, would result in an integer value of 0, where 0 indicates that the ninth data sample would be applied to the first sample subset (M=0).

$$8 \% 8 = 0$$

Likewise, the tenth data sample (K=9) would be applied to the second sample subset (M=1).

$$9 \% 8 = 1$$

The subset for the twenty-first sample (K=20), according to the modulus equation, would be M=4.

$$20 \% 8 = 4$$

An alternative embodiment of the thresholding noise estimator 160 (FIG. 8) provides that any number of sample subsets can be selected based upon the design objectives for the application to which the thresholding noise estimator 160 (FIG. 8) will be applied. Also, one skilled in the art will realize that the process shown in FIG. 13 is the special case of the interleaving process shown in FIG. 14 where the number of sample subsets is one. Any such alternative embodiments of a thresholding noise estimator are intended to be within the scope of this disclosure and be protected by the accompanying claims for the thresholding noise estimator.

Returning now to FIG. 14, the parameters are initialized at the start of the estimation period as follows. The sample number K and the interleaving index M are set to zero at block 354. The peak magnitude for the Mth sample subset P[M]=0 is set to zero, and M is then incremented by 1, at block 356. At block 358, the value of M is compared to the total number of sample subsets J. If M is less than J, the No condition, then the process continues from block 356 to initialize the next parameter as described above. If M is equal to J, the Yes condition, initialization is complete and the process continues at block 360.

The value of M is then set to (M=K % J) at block 360. The value of K is then incremented by 1 at block 360. Then, at block 362, the new data sample is received. At block 364, the magnitude of the sample is compared to the current value of the peak magnitude P[M] for the sample subset to which the new sample is applied. If the magnitude of the data sample is greater than the current value of the peak magnitude for the sample subset, the Yes condition for block 364, then the magnitude of that data sample becomes the new current peak magnitude for the sample subset, as shown by block 366. If the magnitude of the data sample is less than the current value of the peak magnitude for the sample subset, the No condition for block 364, the current value of the peak magnitude is not changed. One skilled in the art will realize that the power of the peak data sample in an interleaving period could be used instead of the magnitude of the peak data sample in an interleaving period without departing substantially from the spirit and principles of the thresholding noise estimator. Any such alternative embodiment of a thresholding noise estimator is intended to be within the scope of this disclosure and be protected by the accompanying claims for the thresholding noise estimator.

At block 368, the sample number K is then checked to determine if K=N (if the fixed sampling period N has expired). At block 368, if K is less than N, the No condition, then the process returns to block 360 (the fixed sampling period has not yet expired) and data sampling continues. If K is equal to N, the Yes condition, then the fixed sampling period has expired.

At block 370, the peak parameter PEAK and subset index M are set to zero. At block 372, the value of PEAK is updated by adding its current value to the Mth subset peak P[M], and then M is incremented by 1. At block 374, the value of M is compared to the total number of sample subsets J. If M is not equal to J, the No condition, the process continues from block 372 to continue generating the sum of the sample subsets as described above. If M is equal to J, the Yes condition, the summation is complete and the average peak value is generated by dividing PEAK by the number of sample subsets J at block 376. Then, the process ends, as shown at block 378.

The process illustrated in the flow chart 350 of FIG. 14 provides a method for determining the peak magnitude of the error signal. By determining the peak magnitude of the error signal, higher levels of noise, such as but not limited to STS noise, can be detected and measured. The peak magnitude of the error signal can then be used to bias settings for data transmission rates over the communication system.

One skilled in the art will realize that alternatively, the peak squared magnitude (or peak instantaneous power) could be determined in alternative embodiments by the method shown in FIG. 14 without departing substantially from the overall functionality to be achieved.

IX. Thresholding Noise Estimator Processes Combined

In an alternative embodiment of a thresholding noise estimator 160 (FIG. 8), any one of the processes shown in FIGS. 9–12 may be combined with any one of the processes of FIGS. 13–14 to create a single noise estimation process that determines a value $A_{err}$, representative of an estimate of the highest magnitude of an error signal with a given probability of occurrence, which is a function of the average power of the error signal exceeding a threshold (FIGS. 9–12) and the peak magnitude of the error signal (FIGS. 13 and 14). $A_{err}$ can be described by the equation below:

$$A_{err} = (C_1 \times P_{mean}) + (C_2 \times PEAK)$$

Where $C_1$ and $C_2$ are constants determined upon measurement or simulation of the appropriate range of noise conditions for the system under design. $P_{mean}$ is the average power of the error signal exceeding a threshold and PEAK is the peak magnitude of the error signal.

Table 1 illustrates the various combinations of the processes shown in FIGS. 9–12 and FIGS. 13 and 14. In Table 1, the process shown in FIG. 9 is denoted as P9. Similarly, FIGS. 10–14 are denoted as P10–P14, respectively.

TABLE 1

Combinations

| | |
|---|---|
| P9 + P13 | P9 + P14 |
| P10 + P13 | P10 + P14 |
| P11 + P13 | P11 + P14 |
| P12 + P13 | P12 + P14 |

For example, the combination of P11+P14 indicates a thresholding noise estimator 160 (FIG. 8) employing time hysteresis (see FIG. 11) and average peak magnitude with interleaving (see FIG. 14). The various combinations of Table 1 creating alternative embodiments of a thresholding noise estimator are intended to be within the scope of this disclosure and the claims of the thresholding noise estimator.

X. Thresholding Noise Estimator Modifications and Variations

It should be emphasized that the above-described embodiments of the thresholding noise estimator, particularly, any "preferred" embodiments, are merely possible examples of implementations, merely set forth for a clear understanding of the principles of the thresholding noise estimator. Many variations and modifications may be made to the above-described embodiment(s) of the thresholding noise estimator without departing substantially from the spirit and principles of the thresholding noise estimator. All such modifications and variations are intended to be included herein within the scope of this disclosure and the thresholding noise estimator and protected by the following claims.

XI. Alternative Embodiments

Alternative embodiments of a thresholding noise estimator are equally applicable to other types of receivers or other devices wherein an error signal is generated. For example, a part of digital equipment 152 (FIG. 7), located at the CO, is a receiver. This receiver portion performs substantially the same functions as the receiver portion of digital device 156 (FIG. 7) located at the CP. Digital equipment 152 may be implemented in various forms, such as but not limited to a card in a cage, a card in a modem, and/or a stand alone device. A thresholding noise estimator implemented in digital equipment 152 may employ magnitude hysteresis, time hysteresis, or a combination of magnitude and time hysteresis as described herein. Any such alternative embodiments of a thresholding noise estimator implemented in digital equipment 152 are intended to be within the scope of this disclosure and be protected by the accompanying claims for the thresholding noise estimator.

A thresholding noise estimator may be applicable to other electronic and/or electrical devices. For example, telephones 142 (FIG. 7) or any of the various digital equipment 154 (FIG. 7) may have a thresholding noise estimator implemented therein. Likewise, other communication mediums, which may be either analog or digital, may employ receivers wherein a thresholding noise estimator receives an error signal. Examples of such communication mediums include, but are not limited to, microwave, satellite, radio frequency (RF), power line carrier or coaxial cable. A thresholding noise estimator implemented in such equipment may employ magnitude hysteresis, time hysteresis, or a combination of magnitude and time hysteresis as described herein. Any such alternative embodiments of a thresholding noise estimator implemented in such equipment are intended to be within the scope of this disclosure and be protected by the accompanying claims for the thresholding noise estimator.

What is claimed is:

1. A method for estimating error in an input signal, the method comprising the steps of:

measuring a magnitude of a plurality of data samples from said input signal;

defining as an error sample each one of said plurality of data samples when the magnitude of said data sample is at least equal to a first threshold, such that a plurality of error samples are defined;

calculating a power for each one of said plurality of error samples; and specifying an error indicator, said error indicator corresponding to an average of said calculated powers, wherein said error indicator represents the power of the error in said input signal.

2. The method of claim 1, wherein said specifying step specifies said error indicator corresponding to the root mean square (RMS) magnitude of the error in said input signal.

3. The method of claim 1, wherein said defining step further includes identifying a peak error sample such that said peak error sample has the greatest magnitude of said plurality of error samples, and wherein said specifying step specifies said error indicator corresponding to said average power and said magnitude of said peak error sample.

4. The method of claim 1, wherein said defining step further comprises the steps of interleaving said plurality of error samples into a predetermined plurality of sample subsets and identifying a peak error sample for each one of said plurality of sample subsets such that said peak error sample has the greatest magnitude of said error samples in each one of said plurality of sample subsets, and wherein said calculating step further calculates said magnitude for each said peak error sample, and wherein said specifying step specifies said error indicator corresponding to said average power and an average of said magnitudes.

5. The method of claim 1, wherein the step of defining said data sample as said error sample continues for a predetermined period of time after said magnitude of said input signal decreases from at least equal to said first threshold to below said first threshold.

6. The method of claim 5, wherein said defining step further includes identifying a peak error sample such that said peak error sample has the greatest magnitude of said plurality of error samples, and wherein said specifying step specifies said error indicator corresponding to said average power and said magnitude of said peak error sample.

7. The method of claim 5, wherein said defining step further comprises the steps of interleaving said plurality of error samples into a predetermined plurality of sample subsets and identifying a peak error sample for each one of said plurality of sample subsets such that said peak error sample has the greatest magnitude of said error samples in each one of said plurality of sample subsets, and wherein said calculating step further calculates said magnitude for each said peak error sample, and wherein said specifying step specifies said error indicator corresponding to said average power and an average of said peak magnitudes.

8. The method of claim 1, wherein the step of defining said data sample as said error sample continues for a predetermined number of data samples after said magnitude of said input signal decreases from at least equal to said first threshold to below said first threshold.

9. The method of claim 8, wherein said defining step further includes identifying a peak error sample such that said peak error sample has the greatest magnitude of said plurality of error samples, and wherein said specifying step specifies said error indicator corresponding to said average power and said magnitude of said peak error sample.

10. The method of claim 8, wherein said defining step further comprises the steps of interleaving said plurality of error samples into a predetermined plurality of sample subsets and identifying a peak error sample for each one of said plurality of sample subsets such that said peak error sample has the greatest magnitude of said error samples in each one of said plurality of sample subsets, and wherein said calculating step further calculates said magnitude for each said peak error sample, and wherein said specifying step specifies said error indicator corresponding to said average power and an average of said peak magnitudes.

11. The method of claim 1, wherein the step of defining said data sample as an error sample continues after said magnitude of said input signal decreases from at least equal to said first threshold to below a second threshold, wherein said second threshold is less than said first threshold.

12. The method of claim 11, wherein said defining step further includes identifying a peak error sample such that said peak error sample has the greatest magnitude of said plurality of error samples, and wherein said specifying step specifies said error indicator corresponding to said average power and said magnitude of said peak error sample.

13. The method of claim 11, wherein said defining step further comprises the steps of interleaving said plurality of error samples into a predetermined plurality of sample subsets and identifying a peak error sample for each one of said plurality of sample subsets such that said peak error sample has the greatest magnitude of said error samples in each one of said plurality of sample subsets, and wherein said calculating step further calculates said magnitude for each said peak error sample, and wherein said specifying step specifies said error indicator corresponding to said average power and an average of said peak magnitudes.

14. The method of claim 1, wherein the step of defining said data sample as an error sample continues after said magnitude of said input signal decreases from at least equal to said first threshold to below a second threshold, and then for a predetermined period of time after said magnitude of said input signal decreases below said second threshold, and wherein said second threshold is less than said first threshold.

15. The method of claim 14, wherein said defining step further includes identifying a peak error sample such that said peak error sample has the greatest magnitude of said plurality of error samples, and wherein said specifying step specifies said error indicator corresponding to said average power and said magnitude of said peak error sample.

16. The method of claim 14, wherein said defining step further comprises the steps of interleaving said plurality of error samples into a predetermined plurality of sample subsets and identifying a peak error sample for each one of said plurality of sample subsets such that said peak error sample has the greatest magnitude of said error samples in each one of said plurality of sample subsets, and wherein said calculating step further calculates said magnitude for each said peak error sample, and wherein said specifying step specifies said error indicator corresponding to said average power and an average of said peak magnitudes.

17. The method of claim 1, wherein said defining step defines as an error sample each one of said plurality of data samples when the power of said data sample is at least equal to said first threshold, such that said plurality of error samples are defined.

18. The method of claim 17, wherein said defining step further includes identifying a peak error sample such that said peak error sample has the greatest magnitude of said plurality of error samples, and wherein said specifying step specifies said error indicator corresponding to said average power and said magnitude of said peak error sample.

19. The method of claim 17, wherein said defining step further comprises the steps of interleaving said plurality of error samples into a predetermined plurality of sample subsets and identifying a peak error sample for each one of said plurality of sample subsets such that said peak error sample has the greatest magnitude of said error samples in each one of said plurality of sample subsets, and wherein said calculating step further calculates said magnitude for each said peak error sample, and wherein said specifying step specifies said error indicator corresponding to said average power and an average of said magnitudes.

20. The method of claim 17, wherein the step of defining said data sample as said error sample continues for a predetermined period of time after said power of said input signal decreases from at least equal to said first threshold to below said first threshold.

21. The method of claim 20, wherein said defining step further includes identifying a peak error sample such that said peak error sample has the greatest magnitude of said plurality of error samples, and wherein said specifying step specifies said error indicator corresponding to said average power and said magnitude of said peak error sample.

22. The method of claim 20, wherein said defining step further comprises the steps of interleaving said plurality of error samples into a predetermined plurality of sample subsets and identifying a peak error sample for each one of said plurality of sample subsets such that said peak error sample has the greatest magnitude of said error samples in each one of said plurality of sample subsets, and wherein said calculating step further calculates said magnitude for each said peak error sample, and wherein said specifying step specifies said error indicator corresponding to said average power and an average of said peak magnitudes.

23. The method of claim 17, wherein the step of defining said data sample as said error sample continues for a predetermined number of data samples after said power of said input signal decreases from at least equal to said first threshold to below said first threshold.

24. The method of claim 23, wherein said defining step further includes identifying a peak error sample such that said peak error sample has the greatest magnitude of said plurality of error samples, and wherein said specifying step specifies said error indicator corresponding to said average power and said magnitude of said peak error sample.

25. The method of claim 23, wherein said defining step further comprises the steps of interleaving said plurality of error samples into a predetermined plurality of sample subsets and identifying a peak error sample for each one of said plurality of sample subsets such that said peak error sample has the greatest magnitude of said error samples in each one of said plurality of sample subsets, and wherein said calculating step further calculates said magnitude for each said peak error sample, and wherein said specifying step specifies said error indicator corresponding to said average power and an average of said peak magnitudes.

26. The method of claim 17, wherein the step of defining said data sample as an error sample continues after said power of said input signal decreases from at least equal to said first threshold to below a second threshold, wherein said second threshold is less than said first threshold.

27. The method of claim 26, wherein said defining step further includes identifying a peak error sample such that said peak error sample has the greatest magnitude of said plurality of error samples, and wherein said specifying step specifies said error indicator corresponding to said average power and said magnitude of said peak error sample.

28. The method of claim 26, wherein said defining step further comprises the steps of interleaving said plurality of error samples into a predetermined plurality of sample subsets and identifying a peak error sample for each one of said plurality of sample subsets such that said peak error sample has the greatest magnitude of said error samples in each one of said plurality of sample subsets, and wherein said calculating step further calculates said magnitude for each said peak error sample, and wherein said specifying step specifies said error indicator corresponding to said average power and an average of said peak magnitudes.

29. The method of claim 17, wherein the step of defining said data sample as an error sample continues after said power of said input signal decreases from at least equal to said first threshold to below a second threshold, and then for a predetermined period of time after said power of said input signal decreases below said second threshold, and wherein said second threshold is less than said first threshold.

30. The method of claim 29, wherein said defining step further includes identifying a peak error sample such that said peak error sample has the greatest magnitude of said plurality of error samples, and wherein said specifying step specifies said error indicator corresponding to said average power and said magnitude of said peak error sample.

31. The method of claim 29, wherein said defining step further comprises the steps of interleaving said plurality of error samples into a predetermined plurality of sample subsets and identifying a peak error sample for each one of said plurality of sample subsets such that said peak error sample has the greatest magnitude of said error samples in each one of said plurality of sample subsets, and wherein said calculating step further calculates said magnitude for each said peak error sample, and wherein said specifying step specifies said error indicator corresponding to said average power and an average of said peak magnitudes.

32. A system for estimating error in an input signal, comprising:
means for measuring the magnitude of a plurality of data samples from said input signal;
means for defining as an error sample each one of said plurality of data samples when the magnitude of said data sample is at least equal to a first threshold, such that a plurality of error samples are defined;
means for calculating a power for each one of said plurality of error samples; and
means for specifying an error indicator, said error indicator corresponding to an average of said calculated powers, wherein said error indicator represents the power of the error in said input signal.

33. The system of claim 32, wherein said means for specifying specifies said error indicator corresponding to the root mean square (RMS) magnitude of the error in said input signal.

34. The system of claim 32, wherein said means for defining further includes a means for identifying a peak error sample such that said peak error sample has the greatest magnitude of said plurality of error samples, and wherein said means for specifying specifies said error indicator corresponding to said average power and said magnitude of said peak error sample.

35. The system of claim 32, wherein said means for defining further comprises a means for interleaving said plurality of error samples into a predetermined plurality of sample subsets and a means for identifying a peak error sample for each one of said plurality of sample subsets such that said peak error sample has the greatest magnitude of said error samples in each one of said plurality of sample subsets, and wherein said means for calculating further calculates said magnitude for each said peak error sample, and wherein said means for specifying specifies said error indicator corresponding to said average power and an average of said peak magnitudes.

36. The system of claim 32, wherein the means for defining said data sample as said error sample continues for a predetermined period of time after said magnitude of said input signal decreases from at least equal to said first threshold to below said first threshold.

37. The system of claim 36, wherein said means for defining further includes a means for identifying a peak error sample such that said peak error sample has the greatest magnitude of said plurality of error samples, and wherein said means for specifying specifies said error indicator corresponding to said average power and said magnitude of said peak error sample.

38. The system of claim 36, wherein said means for defining further comprises a means for interleaving said plurality of error samples into a predetermined plurality of sample subsets and a means for identifying a peak error sample for each one of said plurality of sample subsets such that said peak error sample has the greatest magnitude of said error samples in each one of said plurality of sample subsets, and wherein said means for calculating further calculates said magnitude for each said peak error sample, and wherein said means for specifying specifies said error indicator corresponding to said average power and an average of said peak magnitudes.

39. The system of claim 32, wherein said means for defining said data sample as said error sample continues for a predetermined number of data samples after said magnitude of said input signal decreases from at least equal to said first threshold to below said first threshold.

40. The system of claim 39, wherein said means for defining further includes a means for identifying a peak error sample such that said peak error sample has the greatest magnitude of said plurality of error samples, and wherein said means for specifying specifies said error indicator corresponding to said average power and said magnitude of said peak error sample.

41. The system of claim 39, wherein said means for defining further comprises a means for interleaving said plurality of error samples into a predetermined plurality of sample subsets and a means for identifying a peak error sample for each one of said plurality of sample subsets such that said peak error sample has the greatest magnitude of said error samples in each one of said plurality of sample subsets, and wherein said means for calculating further calculates said magnitude for each said peak error sample, and wherein said means for specifying specifies said error indicator corresponding to said average power and an average of said peak magnitudes.

42. The system of claim 32, wherein said means for defining said data sample as an error sample continues after said magnitude of said input signal decreases from at least equal to said first threshold to below a second threshold, wherein said second threshold is less than said first threshold.

43. The system of claim 42, wherein said means for defining further includes a means for identifying a peak error sample such that said peak error sample has the greatest magnitude of said plurality of error samples, and wherein said means for specifying specifies said error indicator corresponding to said average power and said magnitude of said peak error sample.

44. The system of claim 42, wherein said means for defining further comprises a means for interleaving said plurality of error samples into a predetermined plurality of sample subsets and a means for identifying a peak error sample for each one of said plurality of sample subsets such that said peak error sample has the greatest magnitude of said error samples in each one of said plurality of sample subsets, and wherein said means for calculating further calculates said magnitude for each said peak error sample, and wherein said means for specifying specifies said error indicator corresponding to said average power and an average of said peak magnitudes.

45. The system of claim 32, wherein said means for defining said data sample as an error sample continues after said magnitude of said input signal decreases from at least equal to said first threshold to below a second threshold, and then for a predetermined period of time after said magnitude of said input signal decreases below said second threshold, and wherein said second threshold is less than said first threshold.

46. The system of claim 45, wherein said means for defining further includes a means for identifying a peak error sample such that said peak error sample has the greatest magnitude of said plurality of error samples, and wherein said means for specifying specifies said error indicator corresponding to said average power and said magnitude of said peak error sample.

47. The system of claim 45, wherein said means for defining further comprises a means for interleaving said plurality of error samples into a predetermined plurality of sample subsets and a means for identifying a peak error sample for each one of said plurality of sample subsets such that said peak error sample has the greatest magnitude of said error samples in each one of said plurality of sample subsets, and wherein said means for calculating further calculates said magnitude for each said peak error sample, and wherein said means for specifying specifies said error indicator corresponding to said average power and an average of said peak magnitudes.

48. The system of claim 32, wherein said means for defining defines as an error sample each one of said plurality of data samples when the power of said data sample is at least equal to said first threshold, such that said plurality of error samples are defined.

49. The system of claim 48, wherein said means for defining further includes a means for identifying a peak error sample such that said peak error sample has the greatest magnitude of said plurality of error samples, and wherein said means for specifying specifies said error indicator corresponding to said average power and said magnitude of said peak error sample.

50. The system of claim 48, wherein said means for defining further comprises the a means for interleaving said plurality of error samples into a predetermined plurality of sample subsets and a means for identifying a peak error sample for each one of said plurality of sample subsets such that said peak error sample has the greatest magnitude of said error samples in each one of said plurality of sample subsets, and wherein said means for calculating further calculates said magnitude for each said peak error sample, and wherein said means for specifying specifies said error indicator corresponding to said average power and an average of said peak magnitudes.

51. The system of claim 48, wherein the means for defining said data sample as said error sample continues for a predetermined period of time after said power of said input signal decreases from at least equal to said first threshold to below said first threshold.

52. The system of claim 51, wherein said means for defining further includes a means for identifying a peak error sample such that said peak error sample has the greatest magnitude of said plurality of error samples, and wherein said means for specifying specifies said error indicator corresponding to said average power and said magnitude of said peak error sample.

53. The system of claim 51, wherein said means for defining further comprises a means for interleaving said plurality of error samples into a predetermined plurality of sample subsets and a means for identifying a peak error sample for each one of said plurality of sample subsets such that said peak error sample has the greatest magnitude of said error samples in each one of said plurality of sample subsets, and wherein said means for calculating further calculates said magnitude for each said peak error sample, and wherein said means for specifying specifies said error indicator corresponding to said average power and an average of said peak magnitudes.

54. The system of claim 48, wherein said means for defining said data sample as said error sample continues for a predetermined number of data samples after said power of said input signal decreases from at least equal to said first threshold to below said first threshold.

55. The system of claim 54, wherein said means for defining further includes a means for identifying a peak error sample such that said peak error sample has the greatest magnitude of said plurality of error samples, and wherein said means for specifying specifies said error indicator corresponding to said average power and said magnitude of said peak error sample.

56. The system of claim 54, wherein said means for defining further comprises a means for interleaving said plurality of error samples into a predetermined plurality of sample subsets and a means for identifying a peak error sample for each one of said plurality of sample subsets such that said peak error sample has the greatest magnitude of said error samples in each one of said plurality of sample subsets, and wherein said means for calculating further calculates said magnitude for each said peak error sample, and wherein said means for specifying specifies said error indicator corresponding to said average power and an average of said peak magnitudes.

57. The system of claim 48, wherein said means for defining said data sample as an error sample continues after said power of said input signal decreases from at least equal to said first threshold to below a second threshold, wherein said second threshold is less than said first threshold.

58. The system of claim 57, wherein said means for defining further includes a means for identifying a peak error sample such that said peak error sample has the greatest magnitude of said plurality of error samples, and wherein said means for specifying specifies said error indicator corresponding to said average power and said magnitude of said peak error sample.

59. The system of claim 57, wherein said means for defining further comprises a means for interleaving said plurality of error samples into a predetermined plurality of sample subsets and a means for identifying a peak error sample for each one of said plurality of sample subsets such that said peak error sample has the greatest magnitude of said error samples in each one of said plurality of sample subsets, and wherein said means for calculating further calculates said magnitude for each said peak error sample, and wherein said means for specifying specifies said error indicator corresponding to said average power and an average of said peak magnitudes.

60. The system of claim 48, wherein said means for defining said data sample as an error sample continues after said power of said input signal decreases from at least equal to said first threshold to below a second threshold, and then for a predetermined period of time after said power of said input signal decreases below said second threshold, and wherein said second threshold is less than said first threshold.

61. The system of claim 60, wherein said means for defining further includes a means for identifying a peak error sample such that said peak error sample has the greatest magnitude of said plurality of error samples, and wherein said means for specifying specifies said error indicator corresponding to said average power and said magnitude of said peak error sample.

62. The system of claim 60, wherein said means for defining further comprises a means for interleaving said plurality of error samples into a predetermined plurality of sample subsets and a means for identifying a peak error sample for each one of said plurality of sample subsets such that said peak error sample has the greatest magnitude of said error samples in each one of said plurality of sample subsets, and wherein said means for calculating further calculates said magnitude for each said peak error sample, and wherein said means for specifying specifies said error indicator corresponding to said average power and an average of said peak magnitudes.

63. A computer readable medium having a program for storing a series of instructions for estimating error in an input signal, the program for performing at least the following:

measuring the magnitude of a plurality of data samples from said input signal;

defining as an error sample each one of said plurality of data samples when the magnitude of said data sample is at least equal to a first threshold, such that a plurality of error samples are defined;

calculating a power for each one of said plurality of error samples; and specifying an error indicator, said error indicator corresponding to an average of said calculated powers, wherein said error indicator represents the power of the error in said input signal.

64. A computer readable medium of claim 63, wherein the step of defining said data sample as said error sample continues for a predetermined period of time after a magnitude of said input signal decreases from at least equal to said first threshold to below said first threshold.

65. A computer readable medium of claim 63, wherein the step of defining said data sample as said error sample continues for a predetermined number of data samples after a magnitude of said input signal decreases from at least equal to said first threshold to below said first threshold.

66. A computer readable medium of claim 63, wherein the step of defining said data sample as an error sample continues after said magnitude of said input signal decreases from at least equal to said first threshold to below a second threshold, wherein said second threshold is less than said first threshold.

67. A computer readable medium of claim 63, wherein the series of instructions defines as an error sample each one of said plurality of data samples when the power of said data sample is at least equal to said first threshold, such that said plurality of error samples are defined.

68. The method of claim 1, wherein said defining step further includes identifying a peak error sample such that said peak error sample has the greatest power of said plurality of error samples, and wherein said specifying step specifies said error indicator corresponding to said average power and said power of said peak error sample.

69. The method of claim 1, wherein said defining step further comprises the steps of interleaving said plurality of error samples into a predetermined plurality of sample subsets and identifying a peak error sample for each one of said plurality of sample subsets such that said peak error sample has the greatest power of said error samples in each one of said plurality of sample subsets, and wherein said calculating step further calculates said power for each said peak error sample, and wherein said specifying step specifies said error indicator corresponding to said average power and an average of said powers of said peak error samples in each one of said plurality of sample subsets.

70. The system of claim 32, wherein said means for defining further includes identifying a peak error sample such that said peak error sample has the greatest power of said plurality of error samples, and wherein said specifying step specifies said error indicator corresponding to said average power and said power of said peak error sample.

71. The system of claim 32, wherein said means for defining further comprises a means for interleaving said plurality of error samples into a predetermined plurality of sample subsets and a means for identifying a peak error sample for each one of said plurality of sample subsets such that said peak error sample has the greatest power of said error samples in each one of said plurality of sample subsets, and wherein said means for calculating further calculates said power for each said peak error sample, and wherein said means for specifying specifies said error indicator corresponding to said average power and an average of said powers of said peak error samples in each one of said plurality of sample subsets.

* * * * *